(12) United States Patent
Miyauchi et al.

(10) Patent No.: US 8,559,634 B2
(45) Date of Patent: Oct. 15, 2013

(54) ENCODING/DECODING CIRCUIT

(75) Inventors: Shigenori Miyauchi, Tokyo (JP); Atsuo Yamaguchi, Tokyo (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

(21) Appl. No.: 13/593,133

(22) Filed: Aug. 23, 2012

(65) Prior Publication Data

US 2012/0314858 A1     Dec. 13, 2012

Related U.S. Application Data

(60) Division of application No. 13/172,217, filed on Jun. 29, 2011, which is a continuation of application No. 11/483,849, filed on Jul. 11, 2006, now abandoned.

(30) Foreign Application Priority Data

Jul. 13, 2005 (JP) .................................. 2005-204061

(51) Int. Cl.
    H04L 9/00    (2006.01)
(52) U.S. Cl.
    USPC ............... 380/44; 380/28; 380/277; 380/278; 380/279; 713/162; 713/189; 713/193; 705/51
(58) Field of Classification Search
    USPC .............. 380/28, 44, 277, 278, 279; 713/162, 713/189, 193; 705/51
    See application file for complete search history.

(56) References Cited

U.S. PATENT DOCUMENTS

| 3,441,854 A | 4/1969 | Cole |
| 5,392,354 A | 2/1995 | Takahashi et al. |
| 5,619,196 A | 4/1997 | Escobosa |
| 5,781,136 A | 7/1998 | Imanaka et al. |
| 6,684,365 B1 | 1/2004 | Murayama et al. |
| 7,120,604 B2 | 10/2006 | Maari |
| 7,158,637 B2 | 1/2007 | Ohta et al. |
| 7,774,593 B2 | 8/2010 | Tamai et al. |
| 2002/0150244 A1 | 10/2002 | Kim et al. |
| 2006/0034458 A1 | 2/2006 | Kim et al. |

FOREIGN PATENT DOCUMENTS

| JP | 63-063232 | 3/1988 |
| JP | 01-295293 | 11/1989 |
| JP | 05-206990 | 8/1993 |

(Continued)

OTHER PUBLICATIONS

Office Action dated Mar. 15, 2011, issued in the corresponding Japanese Patent Application No. 2005-204061, and a Partial English Translation thereof.

(Continued)

*Primary Examiner* — Thanhnga B Truong
(74) *Attorney, Agent, or Firm* — Buchanan Ingersoll & Rooney PC

(57) ABSTRACT

An encoding/decoding operation portion includes an encoding/decoding operation circuit and an avoiding path for detouring the encoding decoding operation circuit and can select between encoding or decoding input data in the encoding/decoding operation circuit and detouring the encoding/decoding operation circuit to output the input data without change. Only one wire has to be provided from a selector to a key storage portion and an initialization-vector storage portion. With this construction, it is possible to realize an encoding/decoding circuit which can suppress an increase in the number of wires used to transmit a content of key data to the key storage portion and the initialization-vector storage portion and does not cause complication of circuit layout.

3 Claims, 15 Drawing Sheets

(56) References Cited

FOREIGN PATENT DOCUMENTS

| | | |
|---|---|---|
| JP | 05-244153 | 9/1993 |
| JP | 05-327690 | 12/1993 |
| JP | 2002-057662 | 2/2002 |
| JP | 2002-199453 | 7/2002 |
| JP | 2002-287620 | 10/2002 |
| JP | 2002-374511 | 12/2002 |
| JP | 2004-088505 | 3/2004 |
| JP | 2004-343731 | 12/2004 |

OTHER PUBLICATIONS

Office Action dated Jun. 21, 2011, issued in the corresponding Japanese Patent Application No. 2005-204061, and an English Translation thereof.

EXEMPLARY CHANGE OF STATE

| PROCESSING REQUEST CHANNEL | CHANNEL-1 STATUS REGISTER | CHANNEL-2 STATUS REGISTER | CHANNEL-3 STATUS REGISTER |
|---|---|---|---|
| (INITIAL VALUE) | (0 0) | (0 1) | (1 x) |
| CHANNEL 1 | (1 x) | (0 0) | (0 1) |
| CHANNEL 1 | (1 x) | (0 0) | (0 1) |
| CHANNEL 3 | (0 1) | (0 0) | (1 x) |
| CHANNELS 1 AND 2 | (0 0) | (1 x) | (0 1) |

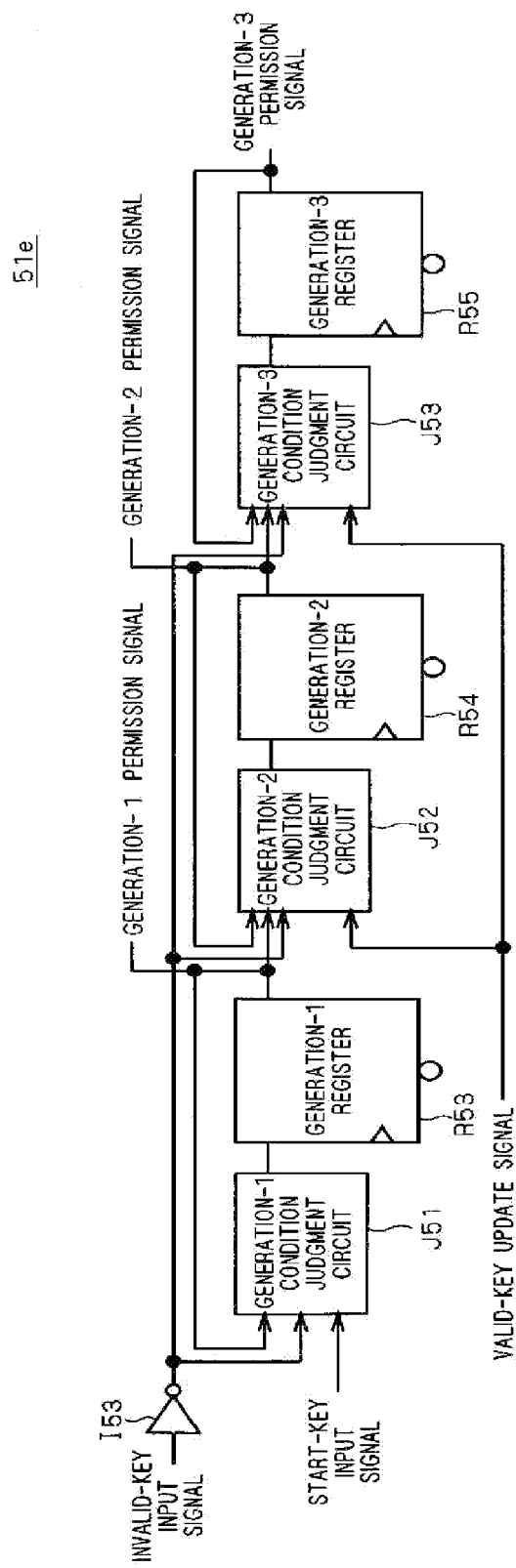
F I G . 1 2

F I G . 1 3
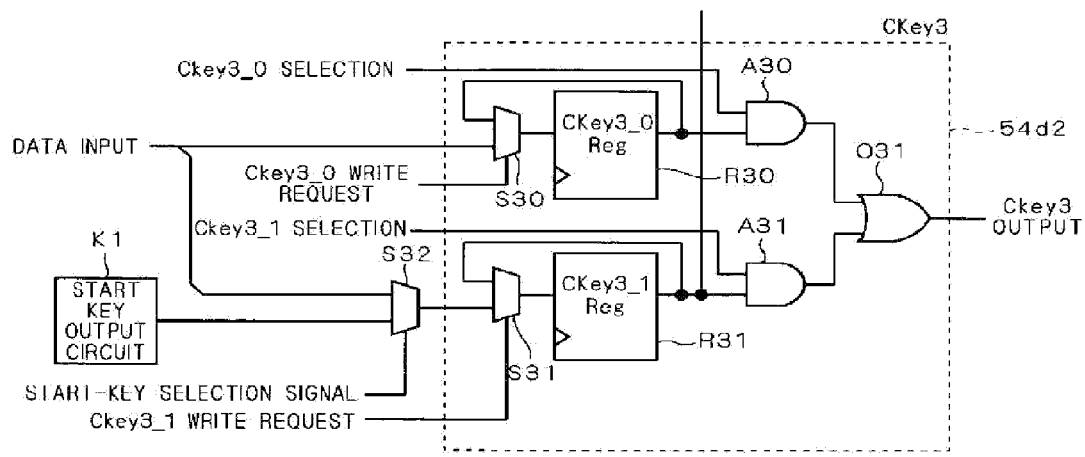

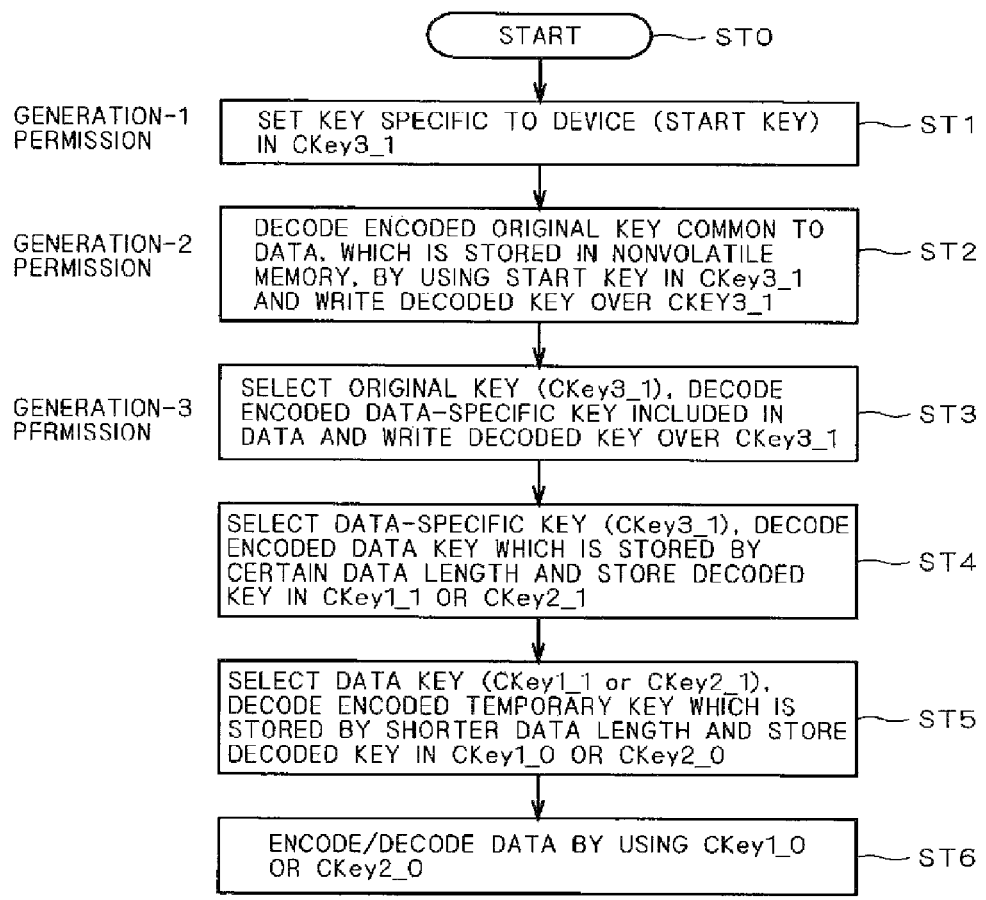

F I G . 1 5
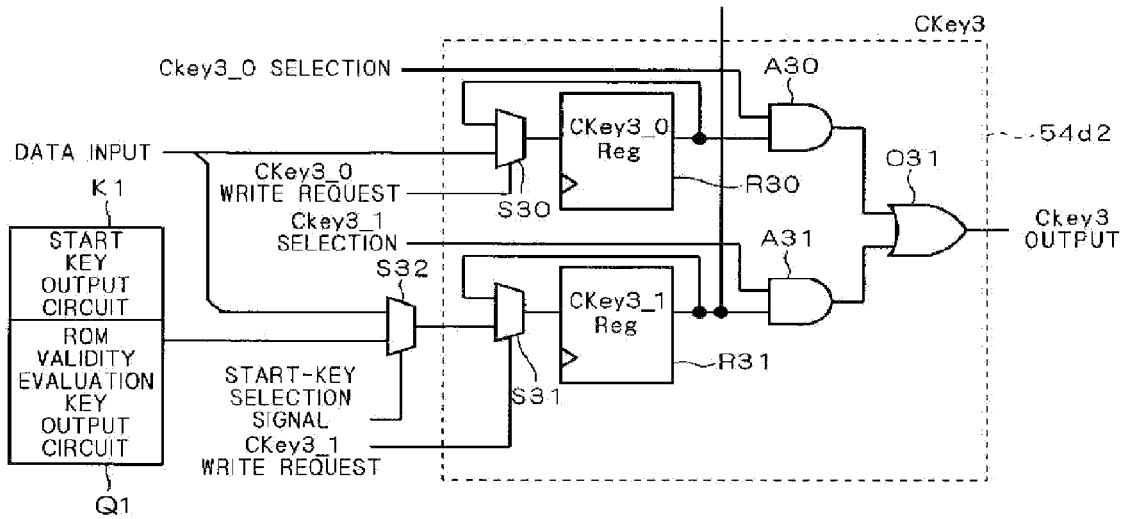
F I G . 1 6
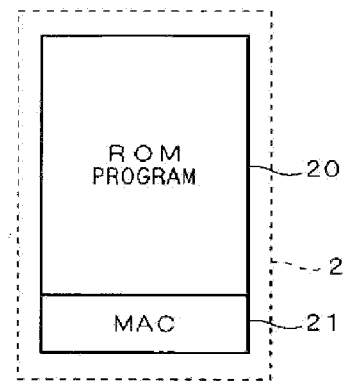

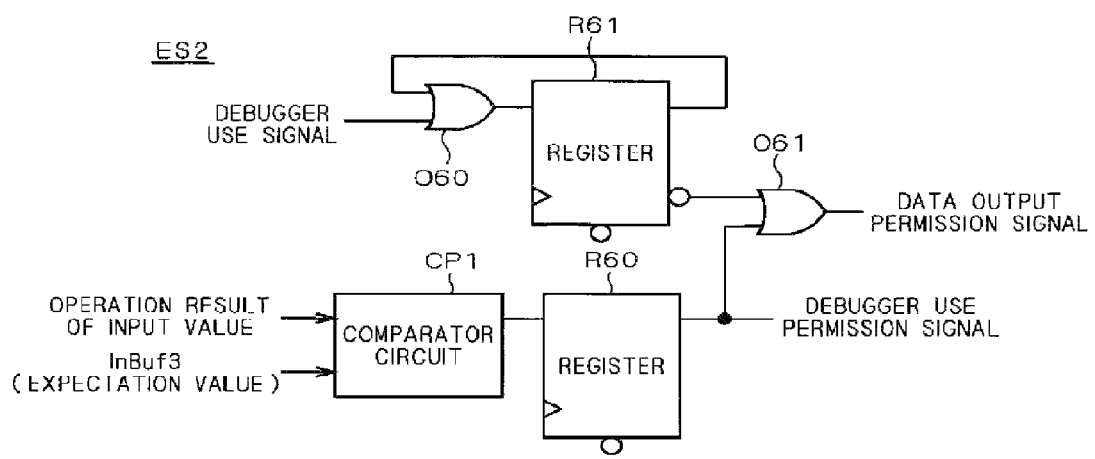
F I G . 1 9

ENCODING/DECODING CIRCUIT

CROSS-REFERENCE TO RELATED APPLICATIONS

This application is a divisional application claiming priority to co-pending U.S. patent application Ser. No. 13/172,217, filed Jun. 29, 2011, which is a continuation application of U.S. patent application Ser. No. 11/483,849, filed Jul. 11, 2006, which claims priority from Japanese Patent Application No. JP2005-204061, filed Jul. 13, 2005, the disclosures of which are hereby incorporated by reference in their entirety.

BACKGROUND OF THE INVENTION

1. Field of the Invention

The present invention relates to an encoding/decoding circuit which ensures the safety of data requiring concealment.

2. Description of the Background Art Patent Document 1, Japanese Patent Application Laid Open Gazette No 2004-88505, discloses an encoding/decoding circuit which can avoid complication of key selection for stream data inputted in parallel. In this circuit, to a plurality of input interfaces, stream data of TV broadcast, stream data recorded in a DVD, stream data of CATV line or the like are inputted in parallel (see Paragraph 0015), and its arbitration portion outputs a decoding key and input data in accordance with an input channel to an encoding/decoding operation portion (see Paragraph 0038). Then, the encoding/decoding operation portion decodes the encoded data which is inputted by using the decoding key inputted from the arbitration portion and outputs the decoded data (see Paragraph 0039).

In Patent Document 1, the construction to set the content of key data in registers 131 to 134 shown in its FIG. 1 is only described as "keys 131 to 134 are each formed of a register and a decoding key of a program in accordance with channel selection of a viewer is set by a control portion of a TV receiving device" (see Paragraph 0025), but no specific description is made on a specific circuit configuration to set the content of the key data. Therefore, in view of this description, it is thought that a plurality of wires are simply provided to supply key data from an input interface or an input stream processing portion to the respective registers 131 to 134. Providing the wires from the input interface or the input stream processing portion to the respective registers 131 to 134, however, causes an increase in the number of wires and complication of circuit layout.

Further, in Patent Document 1, a key storage portion of its FIG. 1 only includes one register (each of 131 to 134) for a channel of data to be encoded or decoded. In order to generate a new key from stream data by using a key stored in the register, it is necessary to obtain the second key through decoding by using the first key stored in the register and then write the second key over the register. After that, in order to obtain a key other than the second key through decoding by using the first key, it is necessary to write the first key over the register again. Such an encoding/decoding operation disadvantageously causes a decrease in throughput of data processing.

Furthermore, Patent Document 1 has a problem that information of a key which requires concealment and output stream data which requires concealment are easily acquired from the outside in an illegal manner and easily interpolated.

If a block encoding/decoding system, such as a CBC (Cipher Block Chaining) system or a CFB (Cipher FeedBack) system, is adopted, it is necessary to give an IV (Initialization Vector) for generation of the first key. A key generated from this IV may be stored inside a chip in which an encoding/decoding circuit is formed or in a nonvolatile memory or the like, which is provided outside.

If a refined process is adopted to reduce the chip cost, however, it becomes difficult to integrate the nonvolatile memory for storing a key and an encoding/decoding program in one chip in which the encoding/decoding circuit is formed. This is because it is difficult to refine a nonvolatile memory and if such a leading-edge process as realizes a gate length of 90 nm is adopted, an encoding/decoding circuit can be formed while it is difficult to form a nonvolatile memory in the same chip through the same process.

It is a matter of course that the safety of key should increase if a nonvolatile memory is integrated in a chip in which an encoding/decoding circuit is formed. The reason is that if a nonvolatile memory is provided outside and the nonvolatile memory which is a general-purpose product is made removable, it becomes easy to remove the nonvolatile memory and interpolate the content of a key stored therein.

In other words, the background-art encoding/decoding circuit of Patent Document 1 gives no consideration to the security of information of a key which requires concealment.

SUMMARY OF THE INVENTION

It is an object of the present invention to realize an encoding/decoding circuit which can suppress an increase in the number of wires used to transmit the content of key data to a data storage portion and does not cause complication of circuit layout. It is another object of the present invention to realize an encoding/decoding circuit which allows an increase in throughput of an encoding/decoding operation. It is still another object of the present invention to realize an encoding/decoding circuit which ensures the safety of data requiring concealment.

The present invention is intended for an encoding/decoding circuit. According to a first aspect of the present invention, the encoding/decoding circuit comprises an input portion, an encoding/decoding operation portion, an output portion and a data storage portion. The encoding/decoding operation portion includes an encoding/decoding operation circuit for encoding or decoding data inputted through the input portion, an avoiding path for causing the data inputted through the input portion to detour the encoding/decoding operation circuit, and a selector for selectively outputting an output of the encoding/decoding operation circuit and an output of the avoiding path. An output of the selector is given to the output portion and the data storage portion. The data storage portion gives data stored therein to the encoding/decoding operation portion.

According to a second aspect of the present invention, the encoding/decoding circuit comprises an encoding/decoding operation portion and a key storage portion. The key storage portion includes a plurality of memory portions for one channel of input data which is to be subject to encoding or decoding in the encoding/decoding operation portion. One of the plurality of memory portions stores a first key for the encoding or the decoding. The encoding/decoding operation portion decodes the input data into a second key for the encoding or the decoding by using the first key stored in the one of the plurality of memory portions and stores the second key into another one of the plurality of memory portions.

According to a third aspect of the present invention, the encoding/decoding circuit comprises an encoding/decoding operation portion and a key storage portion. The key storage portion includes a first memory portion and a plurality of second memory portions corresponding to a plurality of channels of input data which is to be subject to encoding or decoding in the encoding/decoding operation portion, respectively. The first memory portion stores a first key for the encoding or the decoding, which is common to the plurality of channels. The encoding/decoding operation portion decodes the input data into a second key for the encoding or the decoding by using the first key stored in the first memory portion and stores the second key into one of the plurality of second memory portions.

According to a fourth aspect of the present invention, the encoding/decoding circuit comprises a key storage portion, a decoding operation portion for decoding input data which is to be subject to decoding to obtain a second key for the decoding by using a given first key and stores the second key into the key storage portion, and a key validity judgment circuit. The key validity judgment circuit activates a key valid signal indicating the second key is valid if the decoding operation portion obtains the second key through decoding by using the first key, and inactivates the key valid signal if the second key is obtained through decoding by using a key other than the first key.

According to a fifth aspect of the present invention, the encoding/decoding circuit comprises a key storage portion, an encoding/decoding operation portion which uses a given encoding key, for generating a decoding key to decode input data which is encoded by the encoding key, and storing the decoding key into the key storage portion, and a decoding key validity judgment circuit. The decoding key validity judgment circuit activates a decoding key valid signal indicating the decoding key is valid if the encoding/decoding operation portion generates the decoding key by using the encoding key, and inactivates the decoding key valid signal if the decoding key is generated by using a key other than the encoding key.

According to a sixth aspect of the present invention, the encoding/decoding circuit comprises a key storage portion in which a first generation encoding key is stored, an encoding/decoding operation portion, and an encoding key/decoding key generation coincidence judgment circuit. The encoding/decoding operation portion uses the first generation encoding key to generate a second generation encoding key for encoding input data, and updates the first generation encoding key and stores the second generation encoding key into the key storage portion. The encoding/decoding operation portion sequentially uses an n-th (n: natural number) generation encoding key to generate an (n+1)th generation encoding key for encoding the input data, and updates the n-th generation encoding key and stores the (n+1)th generation encoding key into the key storage portion. The encoding/decoding operation portion uses the first generation encoding key to generate a first generation decoding key for decoding the input data which is encoded by the first generation encoding key and stores the first generation decoding key into the key storage portion. The encoding/decoding operation portion sequentially uses encoding keys until the (n+1)th generation to generate decoding keys until the (n+1)th generation for decoding the input data, respectively, and updates an n-th generation decoding key and stores the (n+1)th generation decoding key into the key storage portion. The encoding key/decoding key generation coincidence judgment circuit activates an encoding key/decoding key generation coincidence signal indicating the n-th generation decoding key is valid if the encoding/decoding operation portion generates the n-th generation decoding key by using the corresponding n-th generation encoding key, and inactivates the encoding key/decoding key generation coincidence signal if the n-th generation decoding key is generated by using a key other than the corresponding n-th generation encoding key.

According to a seventh aspect of the present invention, the encoding/decoding circuit comprises a key storage portion in which a first generation encoding key is stored, an encoding/decoding operation portion, and an encoding key/decoding key generation permission circuit. The encoding/decoding operation portion uses the first generation encoding key to generate a second generation encoding key for encoding input data, and updates the first generation encoding key and stores the second generation encoding key into the key storage portion. The encoding/decoding operation portion sequentially uses an n-th (n: natural number) generation encoding key to generate an (n+1)th generation encoding key for encoding the input data, and updates the n-th generation encoding key and stores the (n+1)th generation encoding key into the key storage portion. The encoding/decoding operation portion uses the first generation encoding key to generate a first generation decoding key for decoding the input data which is encoded by the first generation encoding key and stores the first generation decoding key into the key storage portion. The encoding/decoding operation portion sequentially uses encoding keys until the (n+1)th generation to generate decoding keys until the (n+1)th generation for decoding the input data, respectively, and updates an n-th generation decoding key and stores the (n+1)th generation decoding key into the key storage portion. The encoding key/decoding key generation permission circuit generates an encoding key/decoding key n-th generation permission signal indicating the decoding keys until the n-th generation are generated every time when the n-th generation decoding key is generated if the encoding/decoding operation portion generates the n-th generation decoding key to be valid by using the corresponding n-th generation encoding key.

According to an eighth aspect of the present invention, the encoding/decoding circuit comprises an encoding/decoding operation portion, a key storage portion and a start key output circuit including a combination of a plurality of logic gate circuits, for generating a predetermined signal by using the combination and outputting the predetermined signal as a start key. The encoding/decoding operation portion encodes a given first key for encoding or decoding input data by using the start key and stores the first key into the key storage portion.

According to a first aspect of the present invention, the encoding/decoding operation portion includes the encoding/decoding operation circuit, the avoiding path and the selector, and the output of the selector is connected to the output portion and the data storage portion and the data storage portion gives data stored therein to the encoding/decoding operation portion. Therefore, it is possible both to encode or decode the data inputted through the input portion in the encoding/decoding operation circuit to output it to the output portion and the data storage portion and to detour the encoding/decoding operation circuit to output the data without change to the output portion and the data storage portion. If a construction where wires are provided from the input portion to the data storage portion is adopted, like in the background-art technique, when the block encoding/decoding system such as CBC or CFB is adopted in the encoding/decoding operation circuit, a wire from the encoding/decoding operation circuit to the data storage portion is also needed and the connection wiring to the data storage portion is doubly needed. On the other hand, in the present invention, only one wire from the selector to the data storage portion has to be provided, and it is therefore possible to realize an encoding/decoding circuit which can suppress an increase in the number of wires used to transmit the content of key data to the data storage portion and does not cause complication of circuit layout.

According to a second aspect of the present invention, the key storage portion includes a plurality of memory portions for one channel of input data which is to be subject to encoding or decoding in the encoding/decoding operation portion, and the encoding/decoding operation portion decodes the input data into the second key for encoding or decoding by using the first key for encoding or decoding which is stored in one of a plurality of memory portions and stores the second key into another one of a plurality of memory portions. If the key storage portion includes only one memory portion for a channel of input data to be encoded or decoded, like in the background-art technique, it is necessary to decode the input data into the second key by using the first key stored in one memory portion and write the second key over the memory portion. After that, in order to obtain a key other than the second key through decoding by using the first key, it is necessary to write the first key over the memory portion again. On the other hand, in the present invention, the key storage portion includes a plurality of memory portions for a channel of input data and the first key can be kept in one of the memory portions without overwriting. It is therefore possible to increase the throughput of an encoding/decoding operation.

According to a third aspect of the present invention, the key storage portion includes a first memory portion storing a first key for encoding or decoding, which is common to the plurality of channels, and a plurality of second memory portions corresponding to a plurality of channels of input data which is to be subject to encoding or decoding in the encoding/decoding operation portion, respectively, and the encoding/decoding operation portion decodes the input data into the second key for encoding or decoding by using the first key stored in the first memory portion and stores the second key into another one of a plurality of memory portions. If the key storage portion includes only one memory portion for one channel of input data to be encoded or decoded, like in the background-art technique, it is necessary to decode the input data into the second key by using the first key stored in one memory portion and write the second key over the memory portion. After that, in order to obtain a key other than the second key through decoding by using the first key, it is necessary to write the first key over the memory portion again. On the other hand, in the present invention, the key storage portion includes the first memory portion other than a plurality of second memory portions corresponding to a plurality of channels, respectively, and the first key can be kept without overwriting any of a plurality of second memory portions. It is therefore possible to increase the throughput of an encoding/decoding operation.

According to a fourth aspect of the present invention, the key validity judgment circuit activates the key valid signal indicating the second key is valid if the decoding operation portion obtains the second key through decoding by using the first key, and inactivates the key valid signal if the second key is obtained through decoding by using a key other than the first key. Therefore, it becomes possible for the decoding operation portion to judge whether the second key obtained by decoding the input data is generated by using a valid first key or generated by using an invalid key other than the valid key, on the basis of activation/inactivation of the key valid signal. It is therefore possible to realize an encoding/decoding circuit which prevents an illegal use of key and ensures the safety of data requiring concealment.

According to a fifth aspect of the present invention, the decoding key validity judgment circuit activates the decoding key valid signal indicating the decoding key is valid if the encoding/decoding operation portion generates the decoding key by using the encoding key, and inactivates the decoding key valid signal if the decoding key is generated by using a key other than the encoding key. Therefore, it becomes possible for the encoding/decoding operation portion to judge whether the decoding key generated from the encoding key is generated by using a valid encoding key or generated by using an invalid key other than the valid key, on the basis of activation/inactivation of the decoding key valid signal. It is therefore possible to realize an encoding/decoding circuit which prevents an illegal use of key and ensures the safety of data requiring concealment.

According to a sixth aspect of the present invention, the encoding key/decoding key generation coincidence judgment circuit activates the encoding key/decoding key generation coincidence signal indicating the n-th generation decoding key is valid if the encoding/decoding operation portion generates the n-th generation decoding key by using the corresponding n-th generation encoding key, and inactivates the encoding key/decoding key generation coincidence signal if the n-th generation decoding key is generated by using a key other than the corresponding n-th generation encoding key. Therefore, it becomes possible for the encoding/decoding operation portion to judge whether the decoding key generated from the encoding key is generated by using a valid encoding key or generated by using an invalid key other than the valid key, on the basis of activation/inactivation of the encoding key/decoding key generation coincidence signal. It is therefore possible to realize an encoding/decoding circuit which prevents an illegal use of key and ensures the safety of data requiring concealment.

According to a seventh aspect of the present invention, the encoding key/decoding key generation permission circuit generates the encoding key/decoding key n-th generation permission signal indicating the decoding keys until the n-th generation are generated every time when the n-th generation decoding key is generated if the encoding/decoding operation portion generates the n-th generation decoding key to be valid by using the corresponding n-th generation encoding key. Therefore, it is possible for the encoding/decoding operation portion to perform an operation which should be permitted in accordance with the stage of generation and this realizes an encoding/decoding circuit which prevents an illegal use of key and ensures the safety of data requiring concealment.

According to an eighth aspect of the present invention, the encoding/decoding circuit comprises the start key output circuit including a combination of a plurality of logic gate circuits, for generating a predetermined signal by using the combination and outputting the predetermined signal as the start key, and the encoding/decoding operation portion encodes the given first key for encoding or decoding input data by using the start key and stores the first key into the key storage portion. Since the start key is generated by the combination of a plurality of logic gate circuits, the start key can not be changed from the outside. Therefore, as the safety of the first key encoded by the start key is improved, it is possible to realize an encoding/decoding circuit which prevents an illegal use of key and ensures the safety of data requiring concealment.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a view showing an encoding key/decoding key generation permission circuit in accordance with a seventh preferred embodiment;

FIG. 13 is a view showing a configuration of a key storage portion for channel 3 and its vicinity in accordance with an eighth preferred embodiment;

FIG. 14 is a flowchart showing a decoding operation in accordance with the eighth preferred embodiment;

FIG. 15 is a view showing a configuration of a key storage portion for channel 3 and its vicinity in accordance with a ninth preferred embodiment;

FIG. 16 is a view showing a content stored in a nonvolatile memory in accordance with the ninth preferred embodiment;

FIG. 19 is a view showing a specific example of configuration of a validity evaluation circuit in accordance with the tenth preferred embodiment;

DESCRIPTION OF THE PREFERRED EMBODIMENTS

The First Preferred Embodiment

The first preferred embodiment is intended for an encoding/decoding circuit which comprises an encoding/decoding operation portion including an encoding/decoding operation circuit and an avoiding path for detouring the encoding/decoding operation circuit and can select between encoding or decoding input data in the encoding/decoding operation circuit and detouring the encoding/decoding operation circuit to output the input data without change, and the encoding/decoding circuit can suppress an increase in the number of wires to transmit the content of key data to a data storage portion.

Figure 1:
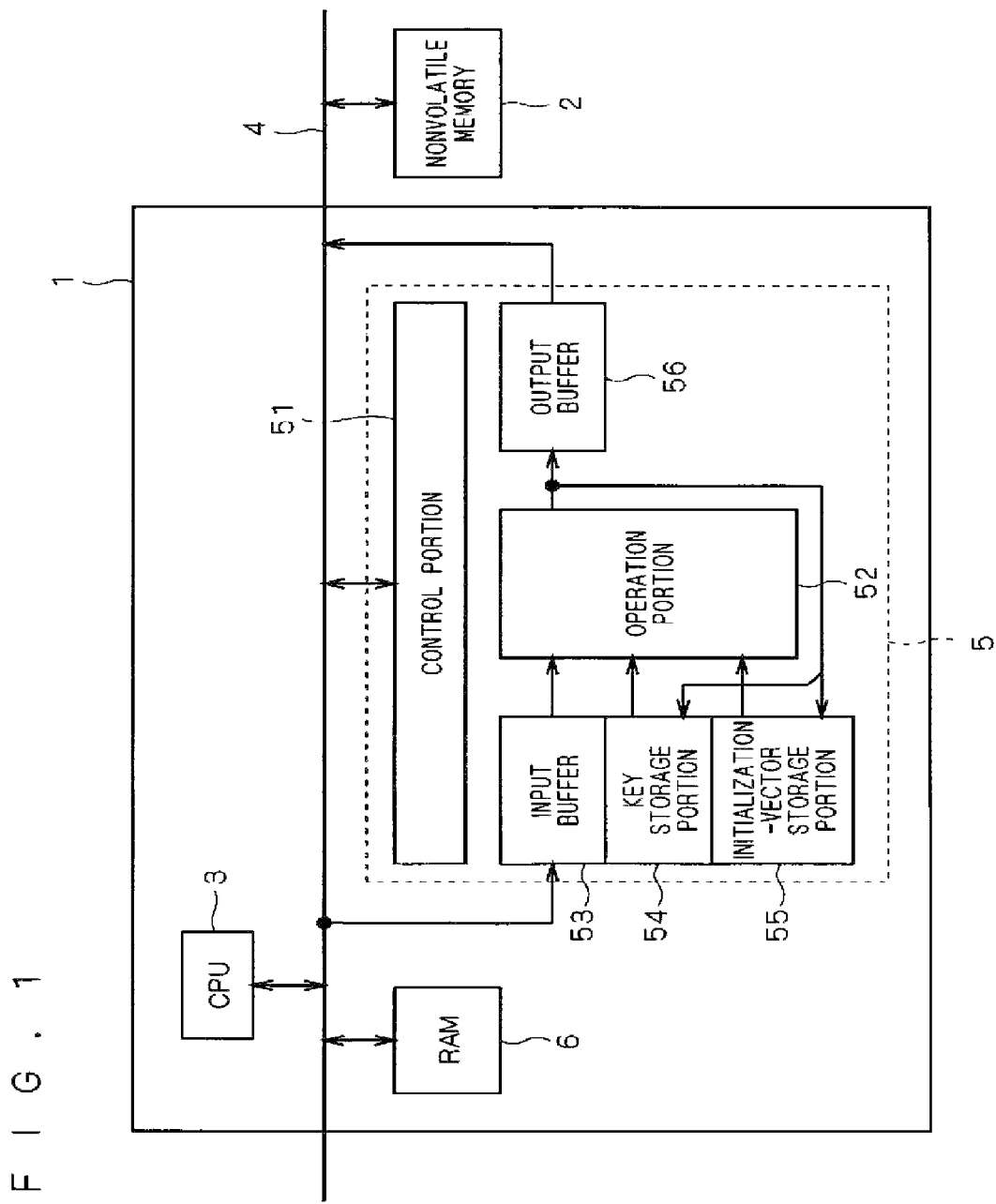
FIG. 1 is a view showing an exemplary constitution of an encoding/decoding circuit in accordance with the present invention.

FIG. 1 shows an exemplary constitution of an encoding/decoding circuit in accordance with the present invention. The encoding/decoding circuit is formed of an IC (Integrated Circuit) chip 1 which integrates a microcomputer, and FIG. 1 shows that the circuits surrounded by the box of reference numeral 1 are integrated in one chip. The IC chip 1 comprises a CPU (Central Processing Unit) 3 for controlling an operation of the encoding/decoding circuit, a bus 4 for transmitting data, a RAM (Random Access Memory) 6 for storing operation data or temporary data therein and an encoding/decoding operation device 5 for performing an encoding/decoding operation. The CPU 3, the RAM 6 and the encoding/decoding operation device 5 are each connected to the bus 4.

Outside the IC chip 1, a nonvolatile memory 2 is provided to store therein an operation program for the CPU 3 and key data needed for an operation in the encoding/decoding operation device 5, and the nonvolatile memory 2 is connected to the bus 4 which extends to the outside of the IC chip 1. The nonvolatile memory 2 may be a general-purpose product which is removable from the bus 4 or an integrated memory which is formed together with the IC chip 1 in the same chip.

The encoding/decoding operation device 5 comprises a control portion 51 for controlling constituent elements in the encoding/decoding operation device 5 under the instruction of the CPU 3, an input buffer 53 in which input data to be processed is temporarily stored, a key storage portion 54 in which key data needed for the encoding/decoding operation of the input data is stored, an initialization-vector storage portion 55 in which an IV (Initialization Vector) which is needed in adopting a block encoding/decoding system such as a CBC (Cipher Block Chaining) system is stored, an encoding/decoding operation portion 52 for performing an encoding/decoding operation of the input data and an output buffer 56 in which an operation result is temporarily stored.

Herein, an outline of data flow will be discussed, taking a case of encoding data in a CBC system as an example. First, the CPU 3 copies key data stored in the nonvolatile memory 2 to the key storage portion 54 through the bus 4. Next, the CPU 3 sets an IV in the initialization-vector storage portion 55. Since the IV does not need concealment, the IV may be given from the outside of the IC chip 1 and the nonvolatile memory 2 or transmitted from the inside of the nonvolatile memory 2.

Next, an instruction on the operation is given to the control portion 51 through the CPU 3. Herein, an instruction of performing an encoding operation of data in the CBC system is set. Finally, data to be encoded is inputted to the input buffer 53. The control portion 51 controls the encoding/decoding operation portion 52 to perform an exclusive OR (EXOR) operation of the data stored in the input buffer 53 and the IV and then gives an instruction to the encoding/decoding operation portion 52 to perform an encoding operation and store the operation result to the output buffer 56. In the case of CBC system, since output data of the encoding/decoding operation portion 52 is used as an IV for data to be inputted next, the content of the output data is written over the initialization-vector storage portion 55.

Figure 2:
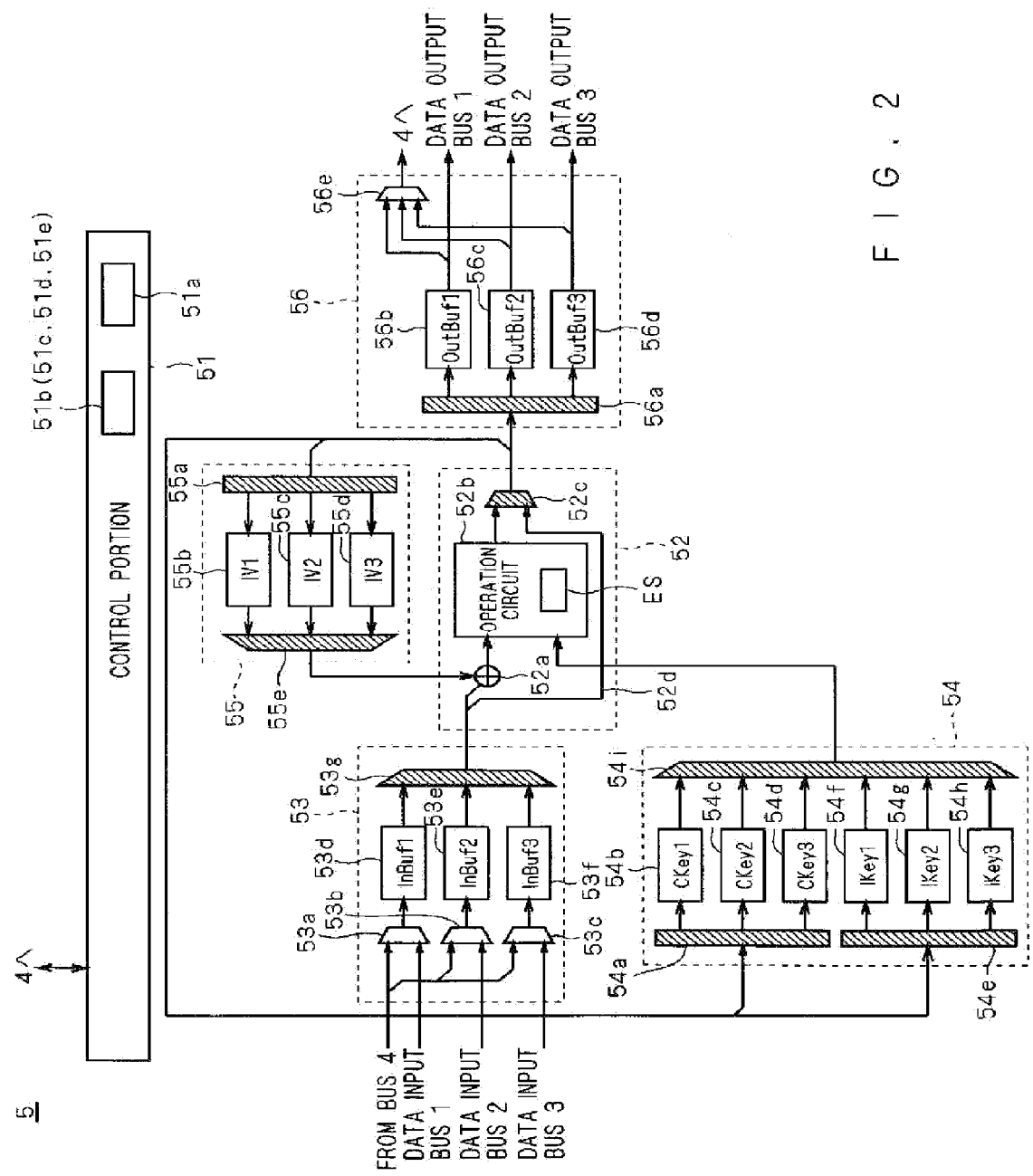
FIG. 2 is a view showing a detailed configuration of an encoding/decoding operation device in accordance with the present invention.

FIG. 2 is a view showing a detailed configuration of the encoding/decoding operation device 5 of FIG. 1. As shown in FIG. 2, the input buffer 53 comprises selectors 53a to 53c and 53g and input buffers (InBuf1-3) 53g to 53f. The key storage portion 54 comprises selectors 54a, 54e and 54i, key storage portions for data encoding (Cipher Keys: CKey1-3) 54b to 54d and key storage portions for data decoding (Inverse Cipher Keys: IKey1-3) 54f to 54h. The initialization-vector storage portion 55 comprises selectors 55a and 55e and initialization-vector storage portions (IV1-3) 55b to 55d.

The encoding/decoding operation portion 52 comprises an exclusive OR circuit 52a for performing an EXOR operation of an output from the selector 53g of the input buffer 53 and an output from the selector 55e of the initialization-vector storage portion 55, an encoding/decoding operation circuit 52b for perform an encoding or decoding operation of an output from the exclusive OR circuit 52a, an avoiding path 52d for causing the output from the selector 53g of the input buffer 53 to detour the encoding/decoding operation circuit 52b and a selector 52c for selectively outputting one of an output of the encoding/decoding operation circuit 52b and an output of the avoiding path 52d. The output buffer 56 comprises selectors 56a and 56e and output buffers (OutBuf1-3) 56b to 56d.

In the first preferred embodiment, it is assumed that data stream processing with three parallel channels is performed. The numeral parts of "InBuf1, 2, 3" correspond to the numbers of channels for inputted data streams, respectively. Herein, the term "channel" refers to a path for processing each data stream. For example, an expression like "data is inputted to a channel 1" is used. To the channels 1, 2 and 3, various data can be inputted and there may be a case, e.g., where the stream data of TV broadcast, stream data from a DVD and stream data of CATV line are assigned to the channels 1, 2 and 3, respectively. For an operation of data inputted to the channel 1 used are reference signs with numerical subscript of 1, such as IV1, InBuf1, Ckey1, Ikey1 or OutBuf1. Data inputted to other channels are also processed by using circuits to which the corresponding numerical subscripts are attached. The encoding/decoding operation portion 52 is shared by all the channels.

In the first preferred embodiment, the selectors 53a to 53c are provided in the first stage of the input buffer 53 in order to allow connection not only to the bus 4 but also to a plurality of input sources (data input buses 1, 2 and 3 in FIG. 2). A plurality of input sources refer to, for example, direct inputs from the RAM 6 and the like. This system can perform more efficient data transmission than a system where data of all the channels are transmitted through only the bus 4. Since there arises competition when data of a plurality of channels are inputted concurrently, however, the control portion 51 needs a circuit to control which channel data should be processed by the encoding/decoding operation portion 52. The output buffer 56 has a configuration on the same ground. On whether the bus 4 is used for the data input/output or dedicated data input buses 1, 2 and 3 are used therefor, the CPU 3 may give an instruction to the control portion 51 in the encoding/decoding operation portion 52 in advance.

Herein, discussion will be made on a procedure of data transmission performed by the encoding/decoding circuit using a plurality of channels in accordance with the first preferred embodiment. Three data streams are inputted to the input buffers 53d to 53f (InBuf1, 2, 3) through the selectors 53a to 53c, respectively. Then, an encoding key or a decoding key of the channel 1 goes through the input buffer 53d (InBuf1), the selector 53g, the avoiding path 52d and the selector 52c and further through the selector 54a or 54e and is stored in the key storage portion 54b (CKey1) or the key storage portion 54f (IKey1). Similarly, an IV of the channel 1 is inputted through the selector 53a to the input buffer 53d (InBuf1) and further goes from the input buffer 53d (InBuf1) through the selector 53g, the avoiding path 52d, the selectors 52c and 55a and is stored in the initialization-vector storage portion 55b (IV1).

These data can be stored at any time when the encoding/decoding operation circuit 52b does not output data to the output buffer 56 through the selectors 52c and 56a. This is because there is no competition of data transmission in the selector 52c. When a plain text data (hereinafter, referred to as "text data") to be encoded or decoded is inputted and stored in the input buffer 53d (InBuf1), the control portion 51 confirms that there is no competition with the processing for the other channels and then the encoding/decoding operation portion 52 performs an operation by using the data stored in the input buffer 53d (InBuf1), the key storage portion 54b (CKey1) or 54f (IKey1) and the initialization-vector storage portion 55b (IV1). The operation result is stored in the output buffer 56b (OutBuf1). For judgment on whether there is some competition or not, a channel priority processing judgment portion described next is used.

Figure 3:
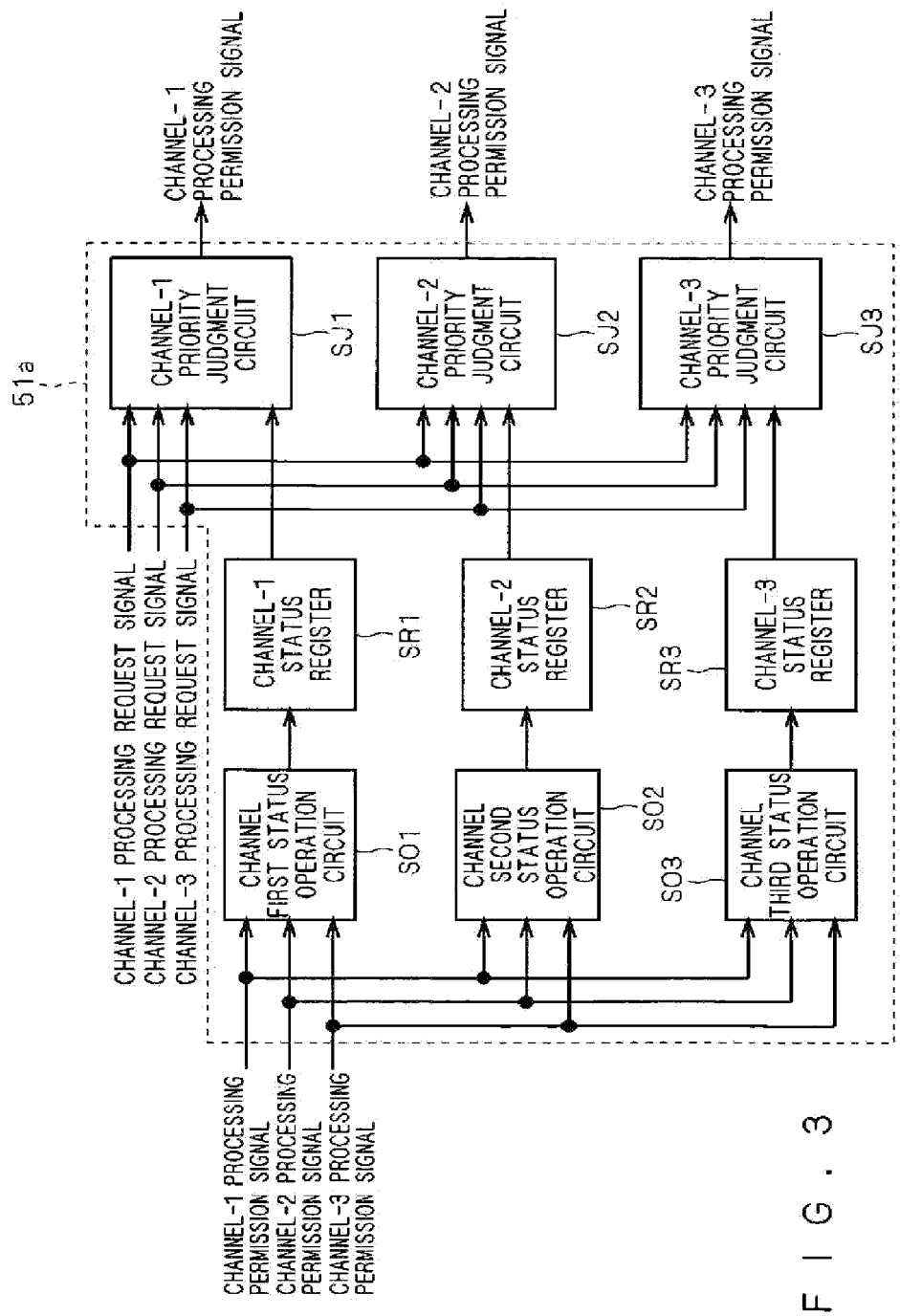
FIG. 3 is a block diagram showing a channel priority processing judgment portion which controls the priorities of channels in accordance with a first preferred embodiment.
Figures 4, 5:
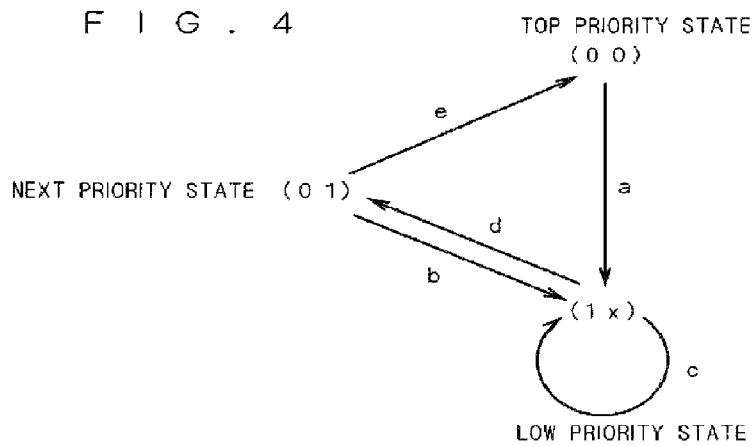
FIG. 4 is an exemplary state transition diagram of the states that the channel priority processing judgment portion can adopt.
FIG. 5 is a view showing transition of channel status registers.

FIG. 3 is a block diagram showing a channel priority processing judgment portion 51a which judges the priority for each of a plurality of channels on the encoding or decoding operation performed in the encoding/decoding operation portion 52b. The channel priority processing judgment portion 51a is provided in the control portion 51. FIG. 4 is an exemplary state transition diagram of respective states (00), (01) and (1x) that the channels can adopt in the channel priority processing judgment portion 51a.

Inside the control portion 51, the channel priority processing judgment portion 51a receives respective channel processing request signals from the channels 1, 2 and 3. The channel priority processing judgment portion 51a includes a channel-1 status register SR1, a channel-2 status register SR2 and a channel-3 status register SR3 which store current statuses of the respective channels, a channel-1 priority judgment circuit SJ1, a channel-2 priority judgment circuit SJ2 and a channel-3 priority judgment circuit SJ3 which judge the priorities of data processing for these channels from the channel-1 processing request signal, the channel-2 processing request signal and the channel-3 processing request signal and values of the channel-1 status register, the channel-2 status register and the channel-3 status register and then output a channel-1 processing permission signal, a channel-2 processing permission signal and a channel-3 processing permission signal on the basis of the judgment result, and a channel-1 next status operation circuit SO1, a channel-2 next status operation circuit SO2 and a channel-3 next status operation circuit SO3 which determine next states of these channels from the channel-1 processing permission signal, the channel-2 processing permission signal and the channel-3 processing permission signal.

In the control portion 51, the channel-1, 2, 3 processing request signals are outputted to the channel priority processing judgment portion 51a in response to that data of some size which is processible is stored in the input buffer 53. The priorities are determined in accordance with the respective values in the status registers SR1 to SR3. In the case of FIG. 4, (00), (01) and (1x) correspond to the top priority state, the next priority state and the low priority state, respectively. Each channel takes any one of the states (00), (01) and (1x). Naturally, as the number of channels increases, the number of states increases.

The top priority state (00) indicates that the data of this channel is always processed even if there is some competition with the other channels. The next priority state (01) indicates that the data of this channel is processed if there is no data processing request for the channel of the top priority state. The low priority state (1x) indicates that the data of this channel is processed if there is no data processing request for the channels of the top priority state and the next priority state. As the initial values after the power-on, there may be a determination that the state of the channel 1 should be (00), that of the channel 2 should be (01) and that of the channel 3 should be (1x).

In FIG. 4, after the channel set in the top priority state (00) is processed, the channel is moved to the low priority state (1x) (as indicated by the arrow a). With this transition, the channel set in the next priority state (01) is moved to the top priority state (00) (as indicated by the arrow e) and the channel set in the low priority state (1x) is moved to the next priority state (01) (as indicated by the arrow d). If there is no processing request for the channel set in the top priority state (00) and there is a processing request for the channel set in the next priority state (01), data of the channel in the next priority state (01) is processed. Then, the channel whose data is processed is moved to the low priority state (1x) (as indicated by the arrow b) and instead of this, the channel set in the low priority state (1x) is moved to the next priority state (01) (as indicated by the arrow d). If there is no processing request for the channels set in the top priority state (00) and the next priority state (01) and there is a processing request for the channel set in the low priority state (1x), data of the channel in the low priority state (1x) is processed. In this case, the channel whose data is processed is kept in the low priority state (1x) (as indicated by the arrow c).

FIG. 5 is a view showing transition of the channel status registers SR1 to SR3 when the data processing request is given to the channel 1, subsequently given to the channel 1, next given to the channel 3 and still next given to the channels 1 and 2 concurrently. For the explanation of the state transition of FIG. 5, first, as the channel 1 in the top priority state (00) has the processing request, data of the channel 1 is processed. After the processing, the channel 1 is moved to the low priority state (1x) (as indicated by the arrow a). With this transition, the channel 2 set in the next priority state (01) is moved to the top priority state (00) (as indicated by the arrow e), and the channel 3 set in the low priority state (1x) is moved to the next priority state (01) (as indicated by the arrow d).

Next, as the channel 1 has the processing request, data of the channel 1 set in the low priority state (1x) is processed. In this case, the channel 1 whose data is processed is kept in the low priority state (1x) (as indicated by the arrow c). The other channels 2 and 3 are also kept in the same states. Subsequently, as the channel 3 set in the next priority state (01) has the processing request, data of the channel 3 in the next priority state (01) is processed. Then, the channel 3 whose data is processed is moved to the low priority state (1x) (as indicated by the arrow b) and instead of this, the channel 1 set in the low priority state (1x) is moved to the next priority state (01) (as indicated by the arrow d). Next, as the channel 1 set in the next priority state (01) and the channel 2 set in the top priority state (00) have the processing request, data of the channel 2 in the top priority state (00) is processed and the channel 2 is moved to the low priority state (1x) (as indicated by the arrow a). With this transition, the channel 1 in the next priority state (01) is moved to the top priority state (00) (as indicated by the arrow e) and the channel 3 in the low priority state (1x) is moved to the next priority state (01) (as indicated by the arrow d).

Thus, the channel priority processing judgment portion 51a judges the priorities by assigning predetermined states which define the priorities to a plurality of channels and moving each of the channels among the predetermined states on the basis of a processing request to each of the channels for encoding or decoding.

Since the selectors 53g, 54a, 54e, 54i, 55a, 55e, 52c and 56a in the encoding/decoding operation device 5 of FIG. 2 are controlled by the control portion 51 on the basis of the channel processing permission signals determined by the channel priority processing judgment portion 51a, it becomes possible to process data of a proper channel without a hitch, not depending on the data input condition. In a case where a plurality of data streams are processed, since the encoding/decoding operation device 5 of the present invention has no overhead for switching of the data streams, it can be calculated that the maximum throughput of each channel=the maximum throughput of the operation circuit/the number of channels.

In the encoding/decoding circuit of the first preferred embodiment, the encoding/decoding operation portion 52 includes the encoding/decoding operation circuit 52b, the avoiding path 52d and the selector 52c, and the output of the selector 52c is connected to the output buffer 56, the key storage portion 54 and the initialization-vector storage portion 55, and the key storage portion 54 and the initialization-vector storage portion 55 give the data stored therein to the encoding/decoding operation portion 52. Therefore, it is possible both to encode or decode the data inputted through the input buffer 53 in the encoding/decoding operation circuit 52b and output the data to the output buffer 56, the key storage portion 54 and the initialization-vector storage portion 55 and also possible to detour the encoding/decoding operation circuit 52b and output the data without change to the output buffer 56, the key storage portion 54 and the initialization-vector storage portion 55. If a construction where wires are provided from the input buffer 53 to the key storage portion 54 and the initialization-vector storage portion 55 is adopted, like in the background-art technique, when the block encoding/decoding system such as CBC or CFB is adopted in the encoding/decoding operation circuit 52b, a wire from the encoding/decoding operation circuit 52b to the key storage portion 54 and the initialization-vector storage portion 55 is also needed and the connection wiring to the data storage portions such as the key storage portion 54 and the initialization-vector storage portion 55 is doubly needed. On the other hand, in the present invention, only one wire from the selector 52c to the key storage portion 54 and the initialization-vector storage portion 55 has to be provided, and it is therefore possible to realize an encoding/decoding circuit which can suppress an increase in the number of wires used to transmit the content of key data to the key storage portion. 54 and the initialization-vector storage portion 55 and does not cause complication of circuit layout.

Moreover, the encoding/decoding circuit of the first preferred embodiment further comprises the channel priority processing judgment portion 51a which judges the priorities for a plurality of channels on the encoding or decoding operation performed in the encoding/decoding operation circuit 52b. Therefore, it is possible to properly encode or decode data which has high priority among a plurality of channels in the encoding/decoding operation circuit 52b.

The Second Preferred Embodiment

The second preferred embodiment is a variation of the encoding/decoding circuit of the first preferred embodiment. In the encoding/decoding circuit of the second preferred embodiment, a plurality of memory portions (registers) are further provided for one channel of input data in the key storage portion 54 of the first preferred embodiment, and a first key for encoding or decoding the input data is stored in one of a plurality of memory portions and a second key is obtained through decoding of the input data by using the first key and is stored in another one of a plurality of memory portions.

Also in the second preferred embodiment, the circuit configurations shown in FIGS. 1 to 5 are adopted. The second preferred embodiment shows a detailed configuration of each of the key storage portions 54b to 54d in the key storage portion 54.

Figure 6:
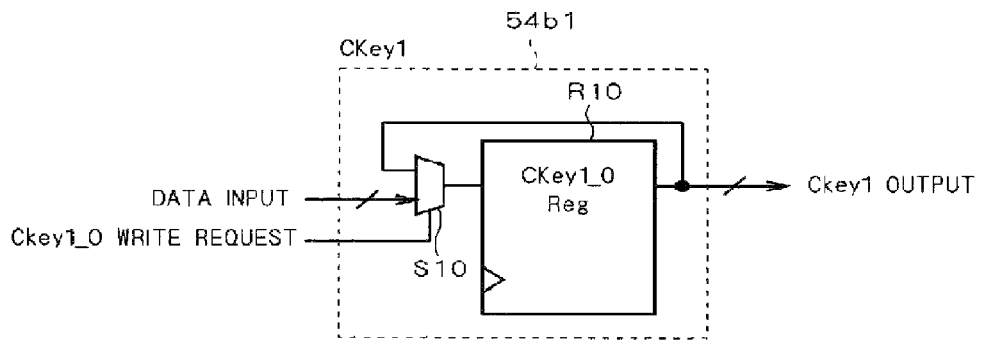
FIG. 6 is a view showing a specific example of configuration of a key storage portion (CKey1) in accordance with a second preferred embodiment.
Figure 7:
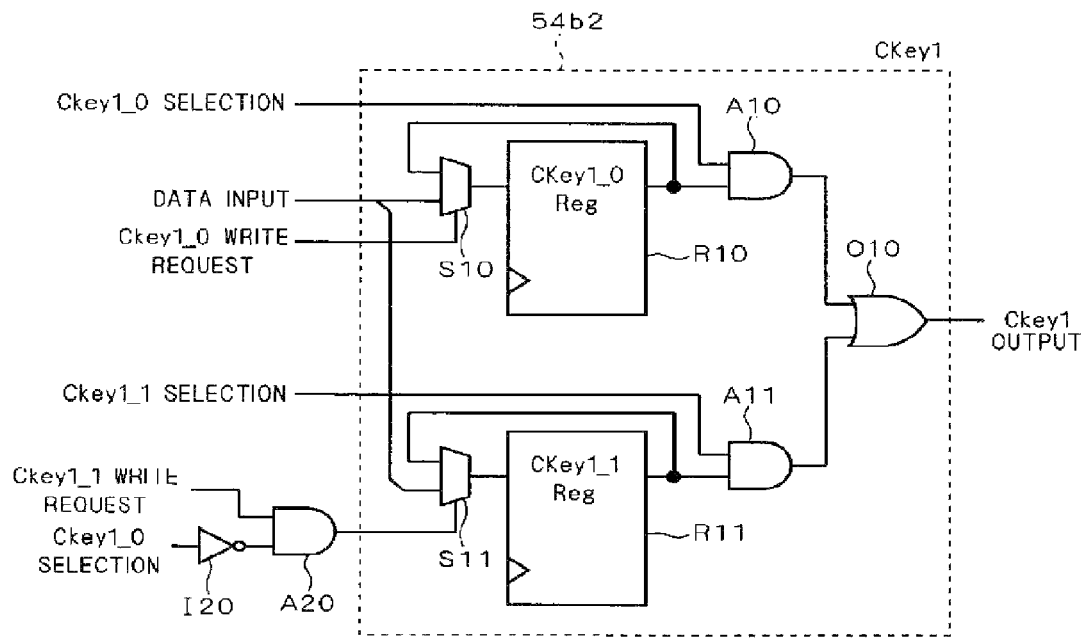
FIG. 7 is a view showing another specific example of configuration of the key storage portion (CKey1) in accordance with the second preferred embodiment.

Specific examples of configuration of the key storage portion 54b (CKey1) are shown in FIGS. 6 and 7 as key storage portions 54b1 and 54b2, respectively. FIG. 6 shows a case where one key can be stored for one channel of input data to be encoded or decoded by the encoding/decoding operation portion 52, and FIG. 7 shows a case where two keys can be stored therefor. Though only the key storage portions 54b1 and 54b2 (CKey1) are shown in FIGS. 6 and 7, the key storage portion 54c (CKey2) and the key storage portion 54d (CKey3) also have the same configuration. Hereinafter, for simple discussion, only the constitutions of the key storage portions 54b1 and 54b2 (CKey1) will be described, as a representative of the key storage portions 54b to 54d.

In FIGS. 6 and 7, parts surrounded by broken lines represent the key storage portions 54b1 and 54b2 (CKey1), respectively. Each of the key storage portions 54b1 and 54b2 (Ckey1) includes a register R10 (CKey1_0) which is a memory portion formed of bits of key length and a selection circuit S10 for data. When a write request signal ("Ckey1_0 WRITE REQUEST" in FIGS. 6 and 7) from the control portion 51 is activated, the selection circuit S10 makes a selection so that key data ("DATA INPUT" in FIGS. 6 and 7) may be outputted for the input of the register R10. When the write request signal from the control portion 51 is inactivated, the selection circuit S10 feeds the output of the register R10 back to the input (the current value is kept).

In FIG. 7, besides the register R10 and the selection circuit S10, another register R11 (CKey1_1) and another selection circuit S11 are additionally provided. The signal input to the register R10 and the selection circuit S10 is the same as shown in FIG. 6. Further, AND gates A20, A10 and A11, an OR gate O10 and an inverter I20 are also provided.

To the AND gate A20, a write request signal ("Ckey1_1 WRITE REQUEST" in FIG. 7) from the control portion 51 and a CKey1_0 selection signal ("Ckey1_0 SELECTION" in FIG. 7) from the control portion 51 passing though the inverter I20, which indicates that a key stored in the register R10 (CKey1_0) is selected as an output to the encoding/decoding operation portion 52, are inputted. To the AND gate A10, the CKey1_0 selection signal and an output of the register R10 (CKey1_0) are inputted, and to the AND gate A11, a CKey1_1 selection signal ("Ckey1_1 SELECTION" in FIG. 7) from the control portion 51, which indicates that a key stored in the register R11 (CKey1_1) is selected as an output to the encoding/decoding operation portion 52, and an output of the register R11 (CKey1_1) are inputted. Respective outputs of the AND gates A10 and A11 are inputted to the OR gate O10 and an output of the OR gate O10 becomes an output of the key storage portion 54b2 (CKey1).

An output of the AND gate A20 is given to the selection circuit S11, and if the CKey1_1 write request signal from the control portion 51 is activated and the key stored in the register R10 (CKey1_0) is not outputted to the encoding/decoding operation portion 52 (CKey1_0 is not selected), the selection circuit 511 makes a selection so that the same key data (data input) as given to the selection circuit S10 may be outputted for the input of the register R11. When the CKey1_1 write request signal from the control portion 51 is inactivated or the key stored in the register R10 (CKey1_0) is outputted to the encoding/decoding operation portion 52 (CKey1_0 is selected), the selection circuit S11 feeds the output of the register R11 back to the input (the current value is kept).

With this configuration, when the CKey1_0 write request signal is activated, the content of the register R10 (Ckey1_0) is replaced by the key data (data input) which passes through the selection circuit S10. The key data (data input) which passes through the selection circuit S11 can be stored in the register R11 (Ckey1_1) only when the CKey1_1 write request signal is given and the encoding/decoding operation result of the data from the register R10 (Ckey1_0) is not the data input.

This means that the key can be generated only through a specific procedure. Such a configuration aims to improve safety of the key. In this example, when such a selection is made as the key data in the register R11 (CKey1_1) should be encoded or decoded in the encoding/decoding operation portion 52 and brought back into the key storage portion 54b2, the operation result can be stored in both the register R10 (CKey1_0) and the register R11 (CKey1_1), but when such a selection is made as the key data in the register R10 (CKey1_0) should be encoded or decoded in the encoding/decoding operation portion 52 and brought back into the key storage portion 54b2, there is a limitation that the operation result can be stored only in the register R10 (CKey1_0).

Though there is an application which uses only one key for data to be encoded or decoded (the configuration of FIG. 6 may be used in this case), it is rare to use the same key for all the data transmission, from the viewpoint of safety, and in most cases, the encoding/decoding operation portion 52 generates a temporary key by using an original start key and performs an encoding or decoding operation of data by using this temporary key.

In many cases, generation of the temporary key is performed a plurality of times. In a case of encoding operation where for one data stream, the start key stored in the nonvolatile memory 2 and the temporary key prepared for the data stream are used, by using the key register having the configuration of FIG. 7, the start key in the nonvolatile memory 2 is stored in the register R11 (CKey1_1) and the temporary key is obtained through decoding of the data stream by using the start key and stored in the register R10 (CKey1_0). In processing data which needs an update of the temporary key by certain length of data, the configuration of FIG. 6 needs a reset of the start key into the register R10 (CKey1_0) every time when the temporary key is generated. With the circuit configuration where one key can be used to obtain the other key through decoding, like the configuration of FIG. 7, it becomes possible to avoid a decrease in throughput caused by switching of the temporary key in switching of data.

In other words, in the second preferred embodiment, the key storage portion 54 includes a plurality of registers R10 and R11 for one channel of the input data to be encoded in the encoding/decoding operation portion 52. The first key (start key) for encoding is stored in the register R11 and the encoding/decoding operation portion 52 decodes the input data into the second key (temporary key) for encoding or decoding by using the first key (start key) stored in one register, i.e., the register R11. Then, the second key (temporary key) is stored in the register R10.

If the key storage portion includes only one register for a channel of the input data to be encoded or decoded, like in the background-art technique, it is necessary to decode the input data into the second key by using the first key (start key)

stored in one register and write the second key over the register. After that, in order to obtain a key other than the second key through decoding by using the first key (start key), it is necessary to write the first key (start key) over the register again. On the other hand, in the present invention, the key storage portion 54 includes a plurality of registers R10 and R11 for each channel of the input data and the first key (start key) can be kept in one of the registers without overwriting. It is therefore possible to increase the throughput of an encoding/decoding operation.

Further, in the encoding/decoding circuit of the second preferred embodiment, if the encoding/decoding operation portion 52 uses the second key (temporary key) stored in the register R10 to decode the input data into a third key (another temporary key) for encoding or decoding, the encoding/decoding operation portion 52 stores the third key (another temporary key) into a register other than the register R11, i.e., the register R10. Therefore, the first key (start key) stored in the register R11 is not overwritten by the third key (another temporary key) obtained through decoding by using the second key (temporary key) and the third key (another temporary key) obtained through decoding can be transmitted only in a specific direction among the registers R10 and R11, to be stored. This makes it difficult to overwrite the first key (start key) stored in the register R11 by an illegal key which is taken, and it is possible to realize an encoding/decoding circuit which prevents an illegal use of key and ensures the safety of data requiring concealment.

Though the configuration of each of the key storage portions 54b to 54d for encoding keys in the key storage portion 54 is shown in the above example, the key storage portions 54f to 54h for decoding keys in the key storage portion 54 may each adopt the same configuration.

The Third Preferred Embodiment

The third preferred embodiment is a variation of the encoding/decoding circuit of the second preferred embodiment. In the encoding/decoding circuit of the third preferred embodiment, a plurality of memory portions (registers) are provided for one channel of input data, like in the second preferred embodiment, and the second key for encoding or decoding is obtained through decoding the input data by using the first key stored in a memory portion for one channel and is stored into one of the memory portions for a different channel.

Also in the third preferred embodiment, the circuit configurations shown in FIGS. 1 to 5 are adopted. The third preferred embodiment shows a detailed configuration of each of the key storage portions 54b to 54d in the key storage portion 54.

In a case where the data stream is shared by the channels 1 and 2 and the encoding/decoding operations are performed at different data positions, such as a case where video data is recorded while data which has been recorded is replayed, part of the key used for the operations of the channels 1 and 2 is shared by the channels 1 and 2. For example, discussion will be made on a case where the start key is common to the whole data stream, and from the start key generated are keys which are used by certain length of data in the data stream and the key used by certain length of data is decoded into a temporary key to be used by shorter length of data to perform an operation. The above configuration of FIG. 6 needs operations of setting a start key common to the whole data in the register R10 (CKey1_0), decoding the common start key of the register R10 (CKey1_0) into a key of certain data length and writing the key over the register R10 (CKey1_0), and then decoding the key of the register R10 (CKey1_0) into a temporary key used by shorter length of data and storing the temporary key into the register R10 (CKey1_0). Since these operations are needed every time when a temporary key is generated, it is expected that the throughput of data transmission should be largely fall.

Figure 8:
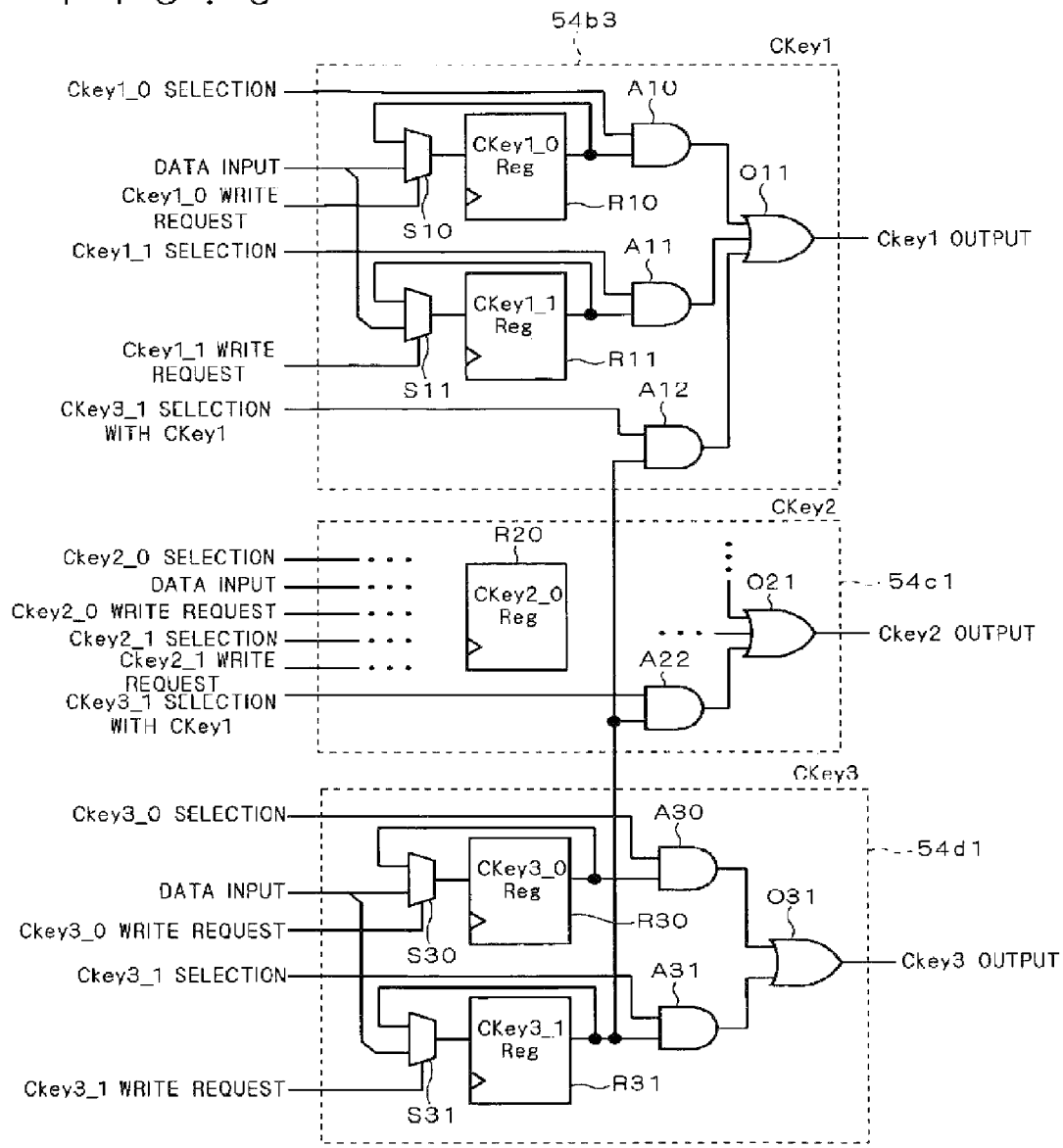
FIG. 8 is a view showing a specific example of configuration of key storage portions (CKey1, CKey2, CKey3) in accordance with a third preferred embodiment.

FIG. 8 is a view showing a specific example of configuration of key storage portions 54b (CKey1), 54c (CKey2) and 54d (CKey3) in accordance with the third preferred embodiment. In FIG. 8, the above constituents are represented as key storage portions 54b3 (CKey1), 54c1 (CKey2) and 54d1 (CKey3). Herein shown is a configuration where a key set in a register R31 (CKey3_1) in the key storage portion 54d1 (CKey3) can be selected in the key storage portions 54b3 (CKey1) and 54c1 (CKey2). Since the channels 1 and 2 are not different in their functions, discussion on the configuration and the signals of the channel 2 will be omitted.

The configuration of the key storage portion 54b3 (CKey1) for the channel 1 is the same as that of the key storage portion 54b2 (CKey1) of FIG. 7 except that the AND gate A20 and the inverter I20 are omitted and the CKey1_0 write request signal is given direct to the selection circuit S11, and an AND gate A12 is additionally provided and an OR gate O11 is adopted to receive outputs from the AND gates A10 to A12, instead of the OR gate O10. The meanings of signals to be inputted to the key storage portion 54b3 (CKey1) are the same as those in the key storage portion 54b2 (CKey1) of FIG. 7. "CKey1_0 SELECTION" indicates a signal which is activated when a key stored in the register R10 (CKey1_0) is used by the encoding/decoding operation portion 52 for the encoding/decoding operation of the channel 1, and "DATA INPUT" indicates an input of data which is outputted from the selector 52c. Further, "CKey1_0 WRITE REQUEST" indicates a signal which is activated when a key is written to the register R10 (CKey1_0) in the channel 1, and "CKey1_1 WRITE REQUEST" indicates a signal which is activated when a key is written to the register R11 (CKey1_1) in the channel 1. "CKey1_1 SELECTION" indicates a signal which is activated when a key stored in the register R11 (CKey1_1) is used by the encoding/decoding operation portion 52 for the encoding/decoding operation of the channel 1.

The key storage portion 54d1 (CKey3) includes a register R30 (CKey3_0) which is a memory portion formed of bits of key length and a selection circuit S30 for data. When a Ckey3_0 write request signal from the control portion 51 is activated, the selection circuit S30 makes a selection so that the key data ("DATA INPUT" in FIG. 8) may be outputted for the input of the register R30. When the Ckey3_0 write request signal from the control portion 51 is inactivated, the selection circuit S30 feeds the output of the register R30 back to the input (the current value is kept).

The key storage portion 54d1 (CKey3) has another register R31 (CKey3_1) and another selection circuit S31, besides the register R30 and the selection circuit S30. Further, AND gates A30 and A31 and an OR gate O31 are also provided.

To the AND gate A30, an output of the register R30 (CKey3_0) and a CKey3_0 selection signal ("Ckey3_0 SELECTION" in FIG. 8) from the control portion 51, which indicates that a key stored in the register R30 (CKey3_0) is selected as an output to the encoding/decoding operation portion 52, are inputted. To the AND gate A31, a CKey3_1 selection signal from the control portion 51, which indicates that a key stored in the register R31 (CKey3_1) is selected as an output to the encoding/decoding operation portion 52, and an output of the register R31 are inputted. Respective outputs of the AND gates A30 and A31 are inputted to the OR gate O31 and an output of the OR gate O31 becomes an output of the key storage portion 54d1 (CKey3).

An output of the register R31 (CKey3_1) of the channel 3 is inputted to one end of the AND gate A12 of the channel 1. To the other end of the AND gate A12, a "CKey3_1 SELECTION WITH CKey1" signal is inputted. This "CKey3_1 SELECTION WITH CKey1" signal indicates a signal which is activated when a key stored in the register R31 (CKey3_1) is used by the encoding/decoding operation portion 52 for the encoding operation of the channel 1. The signals "Ckey3_0 WRITE REQUEST", "Ckey3_1 WRITE REQUEST", "DATA INPUT" and "Ckey3_1 SELECTION" are the same as the above-discussed signals "Ckey1_0 WRITE REQUEST", "Ckey1_1 WRITE REQUEST", "DATA INPUT" and "Ckey1_1 SELECTION" except that the registers to which these signals are inputted are the registers R30 and R31 of the channel 3, instead of the registers R10 and R11 of the channel 1.

In the third preferred embodiment, a key common to the whole data is set in the register R31 (Ckey3_1) of the channel 3, a key of data length is obtained by decoding the common key of the register R31 (CKey3_1) and stored in the register R11 (CKey1_1) of the channel 1 (in the register R21 (CKey2_1) in a case of the channel 2) and then a key to be used by a shorter length of data is obtained through decoding by using the key in the register R11 (Ckey1_1) (the register R21 (Ckey2_1) in the case of the channel 2) and stored in the register R10 (CKey1_0) (in the register R20 (CKey2_0) in the case of the channel 2).

In other words, in the encoding/decoding circuit of the third preferred embodiment, the key storage portion 54 includes the registers R30 and R31 in which the first key for the encoding/decoding operation, which is common to the channels 1 and 2, is stored and the registers R10, R11, R20 and R21 corresponding to the channels 1 and 2 of the input data to be encoded or decoded in the encoding/decoding operation portion 52, respectively, and the encoding/decoding operation portion 52 decodes the input data into the second key for the encoding/decoding operation by using the first key stored in the register R31 and stores the second key into one of the registers R10, R11, R20 and R21.

If the key storage portion includes only one register for a channel of the input data to be encoded or decoded, like in the background-art technique, it is necessary to decode the input data into the second key (of data length) by using the first key (common key) stored in one register and write the second key (of data length) over the register. After that, in order to obtain a key (temporary key) other than the second key (of data length) through decoding by using the first key (common key), it is necessary to write the first key (common key) over the register again. On the other hand, in the present invention, the key storage portion 54 includes the registers R30 and R31 of the channel 3 other than the registers R10 and R11 of the channel 1 and the registers R20 and R21 of the channel 2 and the first key (common key) can be kept without overwriting the registers R10, R11, R20 and R21. It is therefore possible to increase the throughput of an encoding/decoding operation.

Further, in the encoding/decoding circuit of the third preferred embodiment, when the encoding/decoding operation portion 52 decodes the input data into the third key (temporary key) for encoding or decoding by using the second key (of data length) stored in the register R11 or R21, the encoding/decoding operation portion 52 stores the third key (temporary key) into the register R10 or R20 other than the registers R30 and R31. Therefore, the first key (common key) stored in the register R30 and R31 is not overwritten by the third key (temporary key) obtained through decoding by using the second key (of data length) and the third key (temporary key) obtained through decoding can be transmitted only in a specific direction among the registers R30 and R31 and the registers R10, R11, R20 and R21, to be stored. This makes it difficult to overwrite the first key (common key) stored in the registers R30 and R31 by an illegal key which is taken, and it is possible to realize an encoding/decoding circuit which prevents an illegal use of key and ensures the safety of data requiring concealment.

Though the configuration of each of the key storage portions 54b to 54d for encoding keys in the key storage portion 54 is shown in the above example, the key storage portions 54f to 54h for decoding keys in the key storage portion 54 may each adopt the same configuration.

The Fourth Preferred Embodiment

The fourth preferred embodiment is a variation of the encoding/decoding circuit of the first preferred embodiment. In the encoding/decoding circuit of the fourth preferred embodiment, a key validity judgment circuit is further provided in the control portion 51 of the first preferred embodiment and on the basis of activation/inactivation of a key valid signal outputted from the key validity judgment circuit, it is judged whether the second key obtained by decoding the input data is generated by using a valid first key or generated by using an invalid key other than the valid key.

Also in the fourth preferred embodiment, the circuit configurations shown in FIGS. 1 to 5 are adopted. The fourth preferred embodiment shows a detailed configuration of a key validity judgment circuit 51b in the control portion 51 of FIG. 2.

Figure 9:
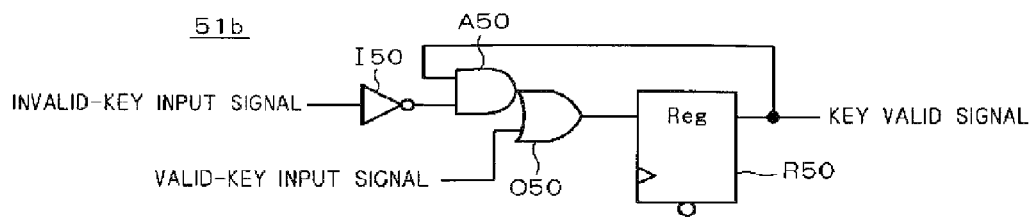
FIG. 9 is a view showing a key validity judgment circuit in accordance with a fourth preferred embodiment.

In order to ensure the safety (validity) of key, the control portion 51 needs a judgment circuit for judging whether a key is obtained through calculation from a predetermined key in decoding of key or not. FIG. 9 shows such a key validity judgment circuit 51b. The key validity judgment circuit 51b comprises an inverter 150, an AND gate A50, an OR gate O50 and a register R50.

An invalid-key input signal is given to an input of the inverter 150. The invalid-key input signal is activated by the control portion 51, for example, when the used key is given as an already-known key from the CPU 3, not a specified key, or when key generation out of a procedure for key generation is requested. An output of the inverter 150 is given to one input end of the AND gate A50. To the other input end of the AND gate A50, an output of the register R50 is given.

A valid-key input signal is given to one input end of the OR gate O50. The valid-key input signal is activated by the control portion 51 when the key is updated through a predetermined procedure. Then, an output of the OR gate O50 is inputted to the register R50. An output of the register R50 becomes the key valid signal.

In other words, the fourth preferred embodiment has a constitution where the encoding/decoding operation portion 52 decodes the input data to be decoded into the second key for decoding by using a given first key and stores the second key into the key storage portion 54, and in this constitution, the key validity judgment circuit 51b activates the key valid signal indicating that the second key is valid, which is outputted from the register R50, when the encoding/decoding operation portion 52 obtains the second key through decoding by using the first key and on the other hand, the key validity judgment circuit 51b inactivates the key valid signal when the second key is obtained through decoding by using a key other than the first key.

Therefore, in the encoding/decoding circuit of the fourth preferred embodiment, by giving the key valid signal to the encoding/decoding operation portion 52, the encoding/decoding operation portion 52 can judge whether the second key obtained by decoding the input data is generated by using the valid first key or generated by using an invalid key other than the first key, on the basis of activation/inactivation of the key valid signal. It is therefore possible to realize an encoding/decoding circuit which prevents an illegal use of key and ensures the safety of data requiring concealment.

Further, it is preferable that the encoding/decoding operation portion 52 should stop decoding of the input data or discard an operation result of the decoding if the given key valid signal is inactivated. With this, it becomes possible to realize an encoding/decoding circuit which prevents an illegal use of key and ensures the safety of data requiring concealment.

The Fifth Preferred Embodiment

The fifth preferred embodiment is a variation of the encoding/decoding circuit of the fourth preferred embodiment. In the encoding/decoding circuit of the fifth preferred embodiment provided is a decoding key validity judgment circuit which has further function to activate a decoding key valid signal indicating the decoding key is valid when the encoding/decoding operation portion 52 generates the decoding key by using an encoding key and inactivate the decoding key valid signal when the decoding key is generated by using a key other than the encoding key, as well as the function of the key validity judgment circuit 51b of the fourth preferred embodiment.

The register R10 (CKey1_0) and the like provided in the key storage portion 54 do not need to be reset functionally, and since the key storage portion 54 has a large number of registers, many registers are each formed of a flip-flop circuit or a latch circuit having no necessity of reset, also in terms of area reduction. If the decoding key IKey to be used for decoding data is generated from a given encoding key CKey and stored, however, by generating a decoding key through a normal procedure and then inputting an invalid encoding key without generation of a decoding key, it becomes possible to create a state where the encoding key is invalid but the decoding key is valid. This means that an operation can be performed by using the decoding key irrelevant to the encoding key.

Though there arises no big problem in a constitution where the operation in the encoding/decoding operation portion 52 is stopped if an encoding key is invalid, in an encoding/decoding circuit under a flexible condition to allow not only a predetermined procedure but also processing of already-known text data if an already-known key irrelevant to the predetermined procedure is inputted from the outside, there is a possibility of causing a decrease in safety of data. On the assumption that such a case would occur, a decoding key validity judgment circuit of the fifth preferred embodiment for judging whether a decoding key is valid for an encoding key or not is shown in FIG. 10.

Figure 10:
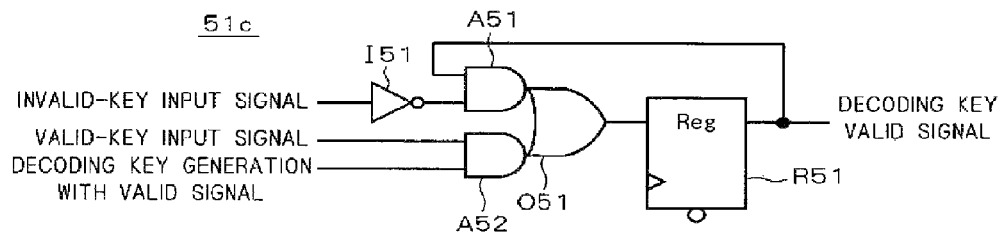
FIG. 10 is a view showing a decoding key validity judgment circuit in accordance with a fifth preferred embodiment.

As shown in FIG. 10, the decoding key validity judgment circuit 51c has almost the same configuration as the key validity judgment circuit 51b of FIG. 9, and comprises an inverter 151, an AND gate A51, an OR gate O51 and a register R51. The decoding key validity judgment circuit 51c also comprises an AND gate A52 which is not provided in the key validity judgment circuit 51b of FIG. 9.

The invalid-key input signal is given to an input of the inverter 151. The invalid-key input signal is the same signal as shown in the key validity judgment circuit 51b of FIG. 9. An output of the inverter 151 is given to one input end of the AND gate A51. To the other input end of the AND gate A51, an output of the register R51 is given.

The valid-key input signal is given to one input end of the AND gate A52. To the other input end of the AND gate A52, a signal indicating that a decoding key is generated by using a valid encoding key ("DECODING KEY GENERATION WITH VALID SIGNAL" in FIG. 10) is given. An output of the AND gate A52 is given to one input end of the OR gate O51. The valid-key input signal is also the same signal as shown in the key validity judgment circuit 51b of FIG. 9. Then, an output of the OR gate O51 is inputted to the register R51. An output of the register R51 becomes the decoding key valid signal.

In other words, the fifth preferred embodiment has a constitution where the encoding/decoding operation portion 52 uses a given encoding key to generate a decoding key for decoding the input data which has been encoded by the given encoding key and stores the decoding key into the key storage portion 54, and in this constitution, the decoding key validity judgment circuit 51c activates the decoding key valid signal indicating that the decoding key is valid, which is outputted from the register R51, when the encoding/decoding operation portion 52 obtains the decoding key through decoding by using the corresponding encoding key and on the other hand, the decoding key validity judgment circuit 51c inactivates the decoding key valid signal when the decoding key is obtained through decoding by using a key other than the corresponding encoding key.

Further, in this circuit, the decoding key valid signal is set only when the valid-key input signal is inputted and the decoding key is generated by using the valid key. If a reset is performed, the decoding key valid signal is initialized (becomes invalid).

In the encoding/decoding circuit of fifth preferred embodiment, the decoding key validity judgment circuit 51c activates the decoding key valid signal indicating that the decoding key is valid when the encoding/decoding operation portion 52 obtains the decoding key through decoding by using the corresponding encoding key and inactivates the decoding key valid signal when the decoding key is obtained through decoding by using a key other than the corresponding encoding key. Therefore, by giving the decoding key valid signal to the encoding/decoding operation portion 52, the encoding/decoding operation portion 52 can judge whether the decoding key is generated by using the valid encoding key or generated by using an invalid key other than the valid encoding key, on the basis of activation/inactivation of the decoding key valid signal. With this, it is possible to realize an encoding/decoding circuit which prevents an illegal use of key and ensures the safety of data requiring concealment.

Further, it is preferable that the decoding key valid signal should be given to the encoding/decoding operation portion 52 and the encoding/decoding operation portion 52 should stop decoding of the input data or discard an operation result of the decoding if the given decoding key valid signal is inactivated. With this, it becomes possible to realize an encoding/decoding circuit which prevents an illegal use of key and ensures the safety of data requiring concealment.

The Sixth Preferred Embodiment

The sixth preferred embodiment is a variation of the encoding/decoding circuit of the fifth preferred embodiment. In the encoding/decoding circuit of the sixth preferred embodiment provided is an encoding key/decoding key generation coincidence judgment circuit which has further function to detect whether the generation of the encoding key and that of the decoding key coincide with each other or not, as well as the function of the decoding key validity judgment circuit 51c of the fifth preferred embodiment.

Even if key generation is performed through a valid procedure, when generation of an original key (the first generation) at the start of the operation, a key which is obtained by decoding the original key, which is common to data (the second generation) and a temporary key (the third generation) which is generated from the data common key and accompanying generation of decoding keys are continued, a combination of keys of different generations can be stored into a key set (e.g., combination of CKey1_1 register and IKey1_1 register). In order to prohibit such a condition, FIG. 11 shows an encoding key/decoding key generation coincidence judgment circuit for judging whether a set of the encoding key and the decoding key are in the same generation or not in accordance with the sixth preferred embodiment.

Figure 11:
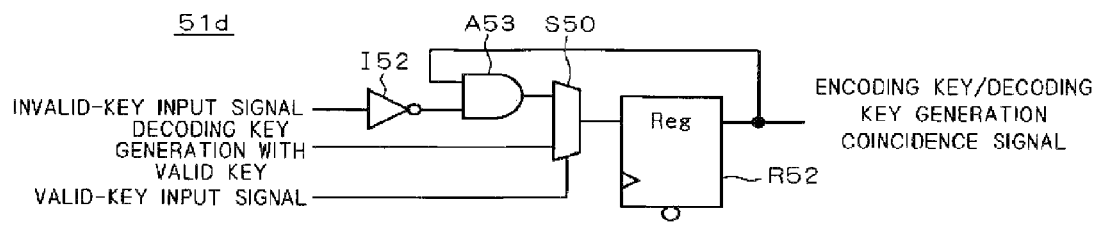
FIG. 11 is a view showing an encoding key/decoding key generation coincidence judgment circuit in accordance with a sixth preferred embodiment.

As shown in FIG. 11, the encoding key/decoding key generation coincidence judgment circuit 51d comprises an inverter 152, an AND gate A53, a selection circuit S50 and a register R52.

The invalid-key input signal is given to an input of the inverter 152. The invalid-key input signal is the same signal as shown in the key validity judgment circuit 51b of FIG. 9. An output of the inverter 152 is given to one input end of the AND gate A53. To the other input end of the AND gate A53, an output of the register R52 is given.

To the selection circuit S50, an output of the AND gate A53 and a signal ("DECODING KEY GENERATION WITH VALID KEY" in FIG. 11) indicating that the decoding key is generated by using a valid encoding key are given. The valid-key input signal (this valid-key input signal is also the same signal as shown in the key validity judgment circuit 51b of FIG. 9) is also given to the selection circuit S50, and in accordance with the value of the valid-key input signal, it is determined whether the output of the AND gate A53 should be outputted from the selection circuit S50 or the signal indicating that the decoding key is generated by using a valid encoding key should be outputted. Specifically, when the valid-key input signal is activated, the signal indicating that the decoding key is generated by using a valid encoding key is selected, and when the valid-key input signal is inactivated, the output of the AND gate A53 is selected. Then, an output of the selection circuit S50 is inputted to the register R52. An output of the register R52 becomes an encoding key/decoding key generation coincidence signal.

If the valid-key input signal is selected and the decoding key is generated by using a valid encoding key, the encoding key/decoding key generation coincidence signal is set. The encoding key/decoding key generation coincidence signal is cleared, for example, if an already-known key is inputted, or if generation of the decoding key is not selected even when a predetermined key update is performed and the valid-key input signal is set, until the invalid-key input signal is set.

In other words, the sixth preferred embodiment has a constitution where the encoding/decoding operation portion 52 uses a first generation encoding key stored in the key storage portion 54 to generate a second generation encoding key for encoding the input data, updates the first generation encoding key and stores the second generation encoding key into the key storage portion 54, and sequentially uses an n-th (n: natural number) generation encoding key to generate an (n+1)th generation encoding key for encoding the input data, updates the n-th generation encoding key and stores the (n+1)th generation encoding key into the key storage portion 54, and the encoding/decoding operation portion 52 further uses the first generation encoding key to generate a first generation decoding key for decoding the input data which has been encoded by the first generation encoding key and stores the first generation decoding key into the key storage portion 54, and sequentially uses encoding keys until the (n+1)th generation to generate decoding keys until the (n+1)th generation for decoding the input data, respectively, updates an n-th generation decoding key and stores the (n+1)th generation decoding key into the key storage portion 54, and in this constitution, the encoding key/decoding key generation coincidence judgment circuit 51d activates the encoding key/decoding key generation coincidence signal indicating that the n-th generation decoding key is valid when the encoding/decoding operation portion 52 generates the n-th generation decoding key by using the corresponding n-th generation encoding key and on the other hand, the encoding key/decoding key generation coincidence judgment circuit 51d inactivates the encoding key/decoding key generation coincidence signal when the n-th generation decoding key is generated by using a key other than the corresponding n-th generation encoding key.

Therefore, in the encoding/decoding circuit of the sixth preferred embodiment, by giving the encoding key/decoding key generation coincidence signal to the encoding/decoding operation portion 52, the encoding/decoding operation portion 52 can judge whether the decoding key is generated by using the valid encoding key or generated by using an invalid key other than the valid encoding key, on the basis of activation/inactivation of the encoding key/decoding key generation coincidence signal. With this, it is possible to realize an encoding/decoding circuit which prevents an illegal use of key and ensures the safety of data requiring concealment.

Further, it is preferable that the encoding/decoding operation portion 52 should stop decoding of the input data or discard an operation result of the decoding if the given encoding key/decoding key generation coincidence signal is inactivated. With this, it becomes possible to realize an encoding/decoding circuit which prevents an illegal use of key and ensures the safety of data requiring concealment.

The Seventh Preferred Embodiment

The seventh preferred embodiment is a variation of the encoding/decoding circuit of the sixth preferred embodiment. The encoding/decoding circuit of the seventh preferred embodiment generates an encoding key/decoding key n-th generation permission signal indicating that decoding keys until the n-th generation are generated every time when the n-th generation decoding key is generated if the encoding/decoding operation portion 52 generates the n-th generation decoding key to be valid by using the corresponding n-th generation encoding key.

By controlling not only whether the encoding key and the decoding key to be processed are in the same generation or not but also until what generation keys are decoded now through the update of key, it is possible to control the access to the generated key by generation. For example, in the first generation, it is prohibited to refer to a key in the register R31 (CKey3_1) from the channels 1 and 2.

An example of encoding key/decoding key generation permission circuit 51e to perform such a function is shown in FIG. 12. The seventh preferred embodiment will be discussed, taking a circuit capable of controlling generated keys until three generations as an example.

The encoding key/decoding key generation permission circuit 51e has an inverter 153, a generation-1 condition judgment circuit J51, a generation-1 register R53, a generation-2 condition judgment circuit J52, a generation-2 register R54, a generation-3 condition judgment circuit J53 and a generation-3 register, R55. The generation-1 condition judgment circuit J51, the generation-2 condition judgment circuit J52 and the generation-3 condition judgment circuit J53 are each a multi-input AND circuit. The invalid-key input signal (this invalid-key input signal is also the same signal as shown in the key validity judgment circuit 51*b* of FIG. 9) is given to the generation-1 condition judgment circuit J51, the generation-2 condition judgment circuit J52 and the generation-3 condition judgment circuit J53 through the inverter 153.

To the generation-1 condition judgment circuit J51, a start-key input signal is given. An output of the generation-1 condition judgment circuit J51 is given to the generation-1 register R53. An output of the generation-1 register R53 (generation-1 permission signal) is given to the generation-2 condition judgment circuit J52 and also fed back to the generation-1 condition judgment circuit J51. To the generation-2 condition judgment circuit J52, a valid-key update signal is given. An output of the generation-2 condition judgment circuit J52 is given to the generation-2 register R54. An output of the generation-2 register R54 (generation-2 permission signal) is given to the generation-3 condition judgment circuit J53 and also fed back to the generation-2 condition judgment circuit J52. The valid-key update signal is also given to the generation-3 condition judgment circuit J53. An output of the generation-3 condition judgment circuit J53 is given to the generation-3 register R55. An output of the generation-3 register R55 (generation-3 permission signal) is fed back to the generation-3 condition judgment circuit J53.

The generation-1 permission signal is activated when a key (start key) used in an initial operation as a valid key is inputted. The generation-2 permission signal is activated when the generation-1 permission signal is set and an effective key update is performed. The generation-3 permission signal is activated when the generation-1 permission signal and the generation-2 permission signal are activated and an effective key update is performed. When a key which is judged as invalid is inputted, the permission signal of each generation is cleared.

In other words, the seventh preferred embodiment has a constitution where the encoding/decoding operation portion 52 uses a first generation encoding key (start key) to generate a second generation encoding key for encoding the input data, updates the first generation encoding key and stores the second generation encoding key into the key storage portion 54, and sequentially uses an n-th (n: natural number) generation encoding key to generate an (n+1)th generation encoding key for encoding the input data, updates the n-th generation encoding key and stores the (n+1)th generation encoding key into the key storage portion 54, and the encoding/decoding operation portion 52 further uses the first generation encoding key to generate a first generation decoding key for decoding the input data which has been encoded by the first generation encoding key and stores the first generation decoding key into the key storage portion 54, and sequentially uses encoding keys until the (n+1)th generation to generate decoding keys until the (n+1)th generation for decoding the input data, respectively, updates an n-th generation decoding key and stores the (n+1)th generation decoding key into the key storage portion 54, and in this constitution, the encoding key/decoding key generation permission circuit 51*e* generates the encoding key/decoding key n-th generation permission signal indicating that decoding keys until the n-th generation are generated every time when the n-th generation decoding key is generated if the encoding/decoding operation portion 52 generates the n-th generation decoding key to be valid by using the corresponding n-th generation encoding key.

Therefore, an operation which should be permitted in accordance with the stage of generation can be performed by the encoding/decoding operation portion 52, and it is thereby possible to realize an encoding/decoding circuit which prevents an illegal use of key and ensures the safety of data requiring concealment.

The Eighth Preferred Embodiment

The eighth preferred embodiment is a variation of the encoding/decoding circuit of the first preferred embodiment. The encoding/decoding circuit of the eighth preferred embodiment includes a combination of a plurality of logic gate circuits and generates a predetermined signal by using the combination, and in the encoding/decoding circuit, a start key output circuit for outputting the predetermined signal as a start key is provided to cause the encoding/decoding operation portion to perform an encoding or decoding operation of the input data by using the start key.

In a system for supplying encoded data, an original key exists to be used for processing all the encoded data in common. This key is loaded in a device for decoding. When the original key which is used for processing the encoded data in common is stored in the nonvolatile memory 2, since the key is transmitted from the nonvolatile memory 2 through the bus 4 to be set in the encoding/decoding operation device 5, by observing the bus 4 with a debugger, it is possible to easily specify the key. In order to prevent a leak of the original key, the original key is encoded by a key (referred to as "start key") which is provided in the encoding/decoding operation device 5 and then stored in the nonvolatile memory 2 and a circuit configuration to disable a readout of the start key to the outside of the encoding/decoding operation device 5 is provided. FIG. 13 shows a configuration of the key storage portion 54 and its vicinity in accordance with the eighth preferred embodiment.

In FIG. 13, a start key output circuit K1 is connected to a key storage portion 54*d*2 of the channel 3 in the key storage portion 54. The start key output circuit K1 is a circuit to output a fixed start key and provided in the encoding/decoding operation device 5. The start key output circuit K1 includes a combination of a plurality of logic gate circuits such as an AND gate and an OR gate and generates a predetermined signal by using the combination to output the predetermined signal as the start key. Since the start key output circuit K1 is constituted of a combination of logic gate circuits, it is impossible to change the start key from the outside.

In the key storage portion 54*d*2, as compared with the key storage portion 54*d*1 of FIG. 8, instead of giving the data input to the selection circuit S31 without change, an output of another selection circuit S32 which receives the data input and a signal of start key from the start key output circuit K1 is given to the selection circuit S31. Further, as a selection signal of another selection circuit S32, a start-key selection signal is given.

In the key storage portion 54*d*2, when the start-key selection signal is activated, the selection circuit S32 gives the signal of start key to the selection circuit S31, instead of the data input. Then, the start key is stored in the register R31 (CKey3_1). The encoding/decoding operation portion 52 encodes a given first key (this key is read out from the nonvolatile memory 2) for encoding or decoding the input data by using the start key and writes the encoded first key over the register R31 (CKey3_1) in the key storage portion 54.

Since the start key has a key architecture only to be read out into the register R31 (CKey3_1), it is impossible to read out the start key to the outside through the output buffer 56*d*

(OutBuf3). Further, with a start-key selection request from the CPU 3 to the control portion 51, the start-key selection signal is set and the start key is thereby stored in the register R31 (CKey3_1).

In other words, the encoding/decoding circuit of the eighth preferred embodiment includes a combination of a plurality of logic gate circuits and generates a predetermined signal by using this combination, and in the encoding/decoding circuit, the start key output circuit K1 is provided to output the predetermined signal as the start key, and the encoding/decoding operation portion 52 encodes the given first key for encoding or decoding the input data by using the start key and stores the first key into the key storage portion 54. Since the start key is generated by using a combination of a plurality of logic gate circuits, it is impossible to change the start key from the outside. Therefore, as the safety of the first key which is encoded by the start key is improved, it is possible to realize an encoding/decoding circuit which prevents an illegal use of key and ensures the safety of data requiring concealment.

The data stream has a key specific to the data stream and is encoded by the original key common to the whole data. Further, a certain unit of the data stream has a data key which is encoded by the key specific to the data stream. Furthermore, a unit of data which is shorter than the unit for the data key has a temporary key encoded by the data key.

A procedure of decoding the key is shown in the flowchart of FIG. 4. First, a key specific to a device is stored in the register R31 (CKey3_1) as the start key (Step ST1). Next, the encoded original key common to the whole data, which is stored in the nonvolatile memory 2, is decoded by the start key in the register R31 (CKey3_1) and the decoded key is written over the register R31 (CKey3_1) (Step ST2). The original key common to data is stored in the nonvolatile memory, being encoded by the start key.

Subsequently, a key specific to data, which is included in the input data, is decoded by using the original key stored in the register R31 (CKey3_1) and the decoded key is written over the register R31 (CKey3_1) again (Step ST3). Next, the data key stored by a certain data length, which is included in the input data, is decoded by the data-specific key stored in the register R31 (CKey3_1) and the decoded key is stored in the register R11 (CKey1_1) or the register R21 (CKey2_1) (Step ST4).

Subsequently, the encoded temporary key included in data of shorter length is decoded by using the data key stored in the register R11 (CKey1_1) or the register R21 (CKey2_1) and the decoded key is stored in the register R10 (CKey1_0) or the register R20 (CKey2_0) (Step ST5).

Then, the input data is encoded or decoded by using the temporary key stored in the register R10 (CKey1_0) or the register R20 (CKey2_0) (Step ST6).

The Ninth Preferred Embodiment

The ninth preferred embodiment is a variation of the encoding/decoding circuit of the eighth preferred embodiment. In the encoding/decoding circuit of the ninth preferred embodiment, a validity evaluation key output circuit is further provided to output a validity evaluation key which is a predetermined signal, and a hash value of the key stored in the nonvolatile memory 2 is obtained by using the validity evaluation key and on the basis of the hash value, it is evaluated whether there is any interpolation of the key in the nonvolatile memory 2 or not.

Even if the start key is used, like in the eighth preferred embodiment, it is not impossible to interpolate the encoded original key common to the data, which is stored in the nonvolatile memory 2, and a program used for decoding the key, and an illegal operation can not be fully prevented. Under such a condition, the ninth preferred embodiment is intended to improve the safety.

FIG. 15 shows a configuration of the key storage portion 54 and its vicinity in accordance with the ninth preferred embodiment. In FIG. 15, besides the configuration of FIG. 13, a ROM validity evaluation key output circuit Q1 is connected to the key storage portion 54d2 of the channel 3 in the key storage portion 54. The ROM validity evaluation key output circuit Q1 is a circuit constituted of a plurality of logic gates like the start key output circuit K1, for outputting a key to evaluate the validity of the ROM (nonvolatile memory 2) which is a predetermined signal.

The ROM validity evaluation key output circuit Q1 can give a signal of validity evaluation key to the selection circuit S32, instead of the start key from the start key output circuit K1. The validity evaluation key can be thereby stored in the register R31 (CKey3_1).

When an encoded key is stored in the nonvolatile memory 2, the encoding/decoding operation portion 52 obtains a hash value of the key by using the validity evaluation key and stores the hash value in the nonvolatile memory 2 as MAC (Message Authentication code). The content of the nonvolatile memory 2 at that time is shown in FIG. 16. In FIG. 16, the data of encoded key is represented as ROM program 20 and the hash value is represented as MAC 21. The hash function should be set to be a unidirectional function with respect to the encoding/decoding operation portion 52.

When the encoding/decoding operation portion 52 performs an operation, a validity evaluation circuit ES in the encoding/decoding operation portion 52 necessarily performs a validity evaluation of the ROM program 20. In this evaluation, first, a ROM validity evaluation key is read out into the register R31 (CKey3_1). Then, by using the ROM validity evaluation key, a given key which is inputted from the outside is decoded. The decoded key is written over the register R31 (CKey3_1). By using the decoded key, the whole ROM program 20 is read out from the channel 3 to calculate the MAC. The calculation result is written over the register R31 (CKey3_1). The output of the calculation result of MAC from the register R31 (CKey3_1) to the output buffer 56d (OutBuf3) should be disabled by the generation control of the seventh preferred embodiment. At the point of time when the calculation of the MAC is finished, the calculation result and the MAC 21 stored in the nonvolatile memory 2 are inputted to the validity evaluation circuit ES.

Figure 17:
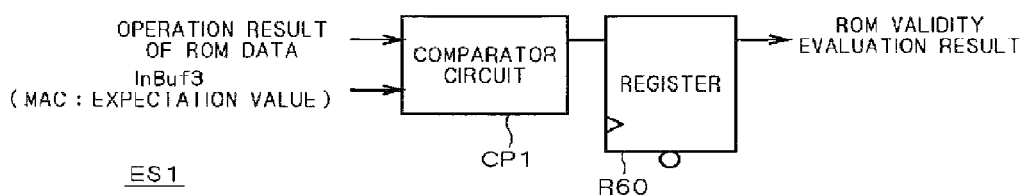
FIG. 17 is a view showing a specific example of configuration of a validity evaluation circuit in accordance with the ninth preferred embodiment.

FIG. 17 is a view showing a specific example of configuration of the validity evaluation circuit ES as a validity evaluation circuit ES1. The validity evaluation circuit ES1 of the ninth preferred embodiment comprises a comparator circuit CP1 and a register R60. The comparator circuit CP1 compares a value of the MAC obtained by calculation from the ROM program 20 which is read out in with a value of the MAC 21 stored in the nonvolatile memory 2, which is read out in through the input buffer 53f (InBuf3). If these values are equal to each other, the comparator circuit CP1 activates its output and the register R60 stores the output of the comparator circuit CP1 therein. If these values are not equal, the comparator circuit CP1 inactivates its output. An output of the register R60 becomes a ROM validity evaluation result signal. The ROM validity evaluation result signal may be written over the register R31 (CKey3_1).

In other words, when an encoded key is stored in the nonvolatile memory 2, the validity evaluation circuit ES1 in the encoding/decoding operation portion 52 obtains the hash value of the key by using the validity evaluation key and stores the hash value into the nonvolatile memory 2 as the MAC 21. Further, when an encoding or decoding operation is performed by using the key stored in the nonvolatile memory 2, the validity evaluation circuit ES1 obtains the hash value of the key read out from the nonvolatile memory 2 by using the validity evaluation key and compares the hash value with the hash value of the MAC 21 stored in the nonvolatile memory 2.

Therefore, if there is any interpolation of the key stored in the nonvolatile memory 2, since the hash value of the key read out from the nonvolatile memory 2 is different from the hash value of the MAC 21 stored in the nonvolatile memory 2, the encoding/decoding operation portion 52 should stop the encoding or decoding operation by using the key read out from the nonvolatile memory 2. It is thereby possible to realize an encoding/decoding circuit which prevents an illegal use of key and ensures the safety of data requiring concealment.

The Tenth Preferred Embodiment

The tenth preferred embodiment is a variation of the encoding/decoding circuit of the ninth preferred embodiment. The encoding/decoding circuit of the tenth preferred embodiment further comprises a debugger verification key output circuit for outputting a debugger verification key which is a predetermined signal, and is intended to prevent an illegal acquisition of data by using a debugger.

A debugger is a device used for debugging a firmware with high efficiency in a development of chips. Since use of the debugger makes it easy to change a program counter, for example, in an encoding/decoding circuit, an operation can be performed with a program for encoding procedure skipped. For this reason, without some means to disable the use of the debugger, it is impossible to ensure the safety of data. Under such a condition, the tenth preferred embodiment is intended to improve the safety.

Figure 18:
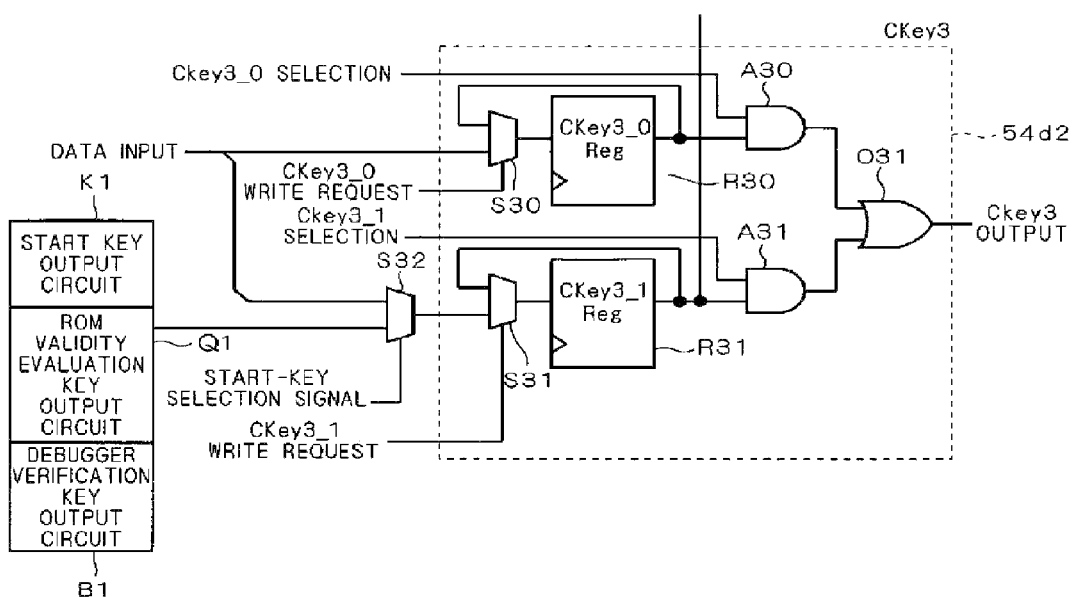
FIG. 18 is a view showing a configuration of a key storage portion for channel 3 and its vicinity in accordance with a tenth preferred embodiment.

FIG. 18 shows a configuration of the key storage portion 54 and its vicinity in accordance with the tenth preferred embodiment. In FIG. 18, besides the configuration of FIG. 15, a debugger verification key output circuit B1 is connected to the key storage portion 54d2 of the channel 3 in the key storage portion 54. The debugger verification key output circuit B1 is a circuit constituted of a plurality of logic gates like the start key output circuit K1, for outputting the debugger verification key which is a predetermined signal.

The debugger verification key output circuit B1 can give a signal of debugger verification key to the selection circuit S32, instead of the start key from the start key output circuit K1. The debugger verification key can be thereby stored in the register R31 (CKey3_1).

The encoding/decoding operation portion 52 encodes or decodes predetermined verification data by using the debugger verification key. Further, the encoding/decoding operation portion 52 receives a debugger use signal indicating that a debugger is used, to detect that a debugger is used. Then, if the encoding/decoding operation portion 52 detects that a debugger is used, the encoding/decoding operation portion 52 stops an encoding or decoding operation of the input data unless a password coincident with the encoded or decoded verification data is inputted.

FIG. 19 is a view showing a specific example of configuration of the validity evaluation circuit ES as a validity evaluation circuit ES2. The validity evaluation circuit ES2 of the tenth preferred embodiment comprises the comparator circuit CP1 and the register R60 which are described in the ninth preferred embodiment. The comparator circuit CP1 compares predetermined verification data which is encoded or decoded by using the debugger verification key with a password given by a user, which is read out in through the input buffer 53f (InBuf3). If these data are equal to each other, the comparator circuit CP1 activates its output and the register R60 stores the output of the comparator circuit CP1 therein. If these data are not equal, the comparator circuit CP1 inactivates its output. The output of the register R60 becomes a debugger use permission signal. The debugger use permission signal may be written over the register R31 (CKey3_1). In outputting the debugger use permission signal and outputting the ROM validity evaluation result signal, the comparator circuit CP1 and the register R60 are shared. Since both the debugger use permission signal and the ROM validity evaluation result signal can be written over the register R31 (CKey3_1), it is possible to share the comparator circuit CP1 and the register R60.

The validity evaluation circuit ES2 of the tenth preferred embodiment further comprises OR gates O60 and O61 and a register R61. To one input end of the OR gate O60, the debugger use signal is given and to the other input end thereof, a positive output of the register R61 is given. An output of the OR gate O60 is inputted to the register R61. An inverted output of the register R61 is given to one input end of the OR gate O61. To the other input end of the register O61, an output of the register R60 (debugger use permission signal) is given. An output of the OR gate O61 becomes a data output permission signal.

Since the positive output of the register R61 is given to the other input end of the OR gate O60, the debugger use signal which is once received is stored in the register R61. This is intended to respond to a case where the debugger is removed after being used to skip a program.

If the debugger use signal is activated, since the inverted output of the register R61 is inactivated, the data output permission signal is not activated unless the debugger use permission signal is activated.

In other words, in the encoding/decoding circuit of the tenth preferred embodiment, the encoding/decoding operation portion 52 encodes or decodes the predetermined verification data by using the debugger verification key and if it detects that a debugger is used, the encoding/decoding operation portion 52 stops the encoding or decoding operation of the input data unless a password coincident with the encoded or decoded verification data is inputted. Therefore, it is possible to realize an encoding/decoding circuit which prevents an illegal acquisition and an illegal use of key by using a debugger and ensures the safety of data requiring concealment.

The Eleventh Preferred Embodiment

The eleventh preferred embodiment is a variation of the encoding/decoding circuit of the tenth preferred embodiment. In the encoding/decoding circuit of the eleventh preferred embodiment, even if a password coincident with the encoded or decoded verification data is inputted, when the hash value of the key read out from the nonvolatile memory 2 is different from the hash value of the MAC 21 stored in the nonvolatile memory 2, the encoding or decoding operation of the input data is stopped.

Figure 20:
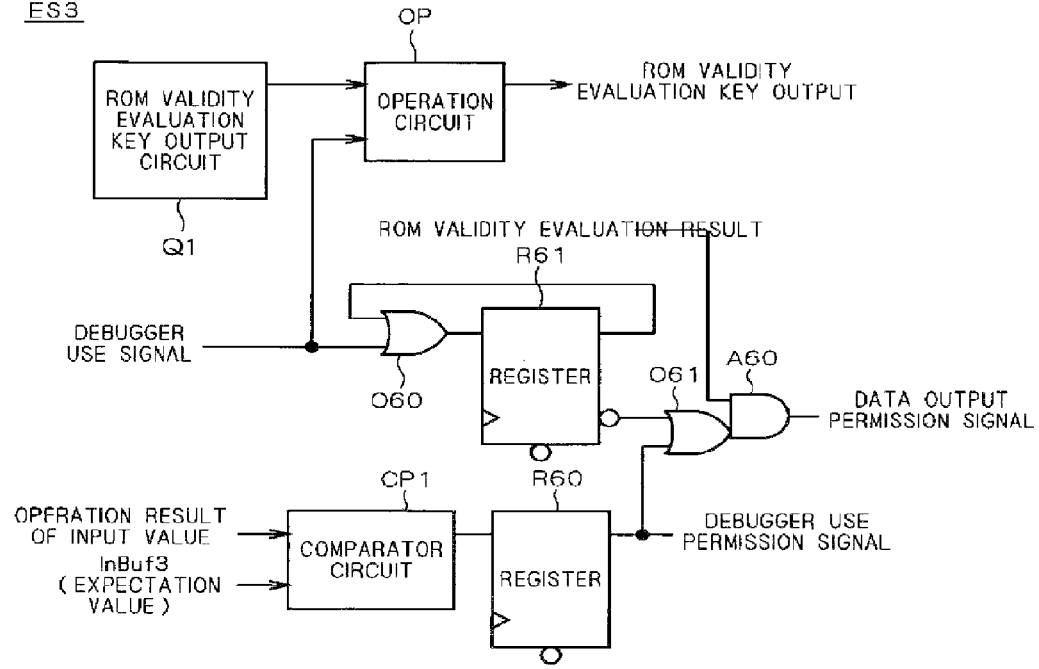
FIG. 20 is a view showing a specific example of configuration of a validity evaluation circuit in accordance with an eleventh preferred embodiment.

FIG. 20 is a view showing a specific example of configuration of the validity evaluation circuit ES in accordance with the eleventh preferred embodiment, as a validity evaluation circuit ES3. The validity evaluation circuit ES3 of the eleventh preferred embodiment further comprises an operation circuit OP for performing an operation of the output of the ROM validity evaluation key output circuit Q1 and the debugger use signal and outputting the operation result as a ROM validity evaluation key output and an AND gate A60 for performing an AND operation of the ROM validity evaluation result outputted from the register R60 of FIG. 17 and the output of the OR gate O61, besides the configuration of the validity evaluation circuit ES2 of FIG. 19 (the comparator circuit CP1, the registers R60 and R61 and the OR gates O60 and O61).

The operation circuit OP outputs the ROM validity evaluation key from the ROM validity evaluation key output circuit Q1 without change when the debugger use signal is inactivated and it changes the ROM validity evaluation key from the ROM validity evaluation key output circuit Q1 and outputs the changed key when the debugger use signal is activated. The AND gate A60 does not activate the data output permission signal unless both the debugger use permission signal and the ROM validity evaluation result are activated.

In other words, the encoding/decoding operation portion 52 stops the encoding or decoding operation of the input data when the hash value of the key read out from the nonvolatile memory 2 is different from the hash value of the MAC 21 stored in the nonvolatile memory 2, even if the password coincident with the encoded or decoded verification data is inputted Therefore, it is possible to realize an encoding/decoding circuit which prevents an illegal acquisition and an illegal use of key by using a debugger and ensures the safety of data requiring concealment.

The Twelfth Preferred Embodiment

The twelfth preferred embodiment is a variation of the encoding/decoding circuit of the eleventh preferred embodiment. In the encoding/decoding circuit of the twelfth preferred embodiment, even if the IC chip 1 can transmit the input data not through the encoding/decoding operation portion 52, when the hash value of the key read out from the nonvolatile memory 2 is different from the hash value of the MAC 21 stored in the nonvolatile memory 2 or when use of a debugger is detected and there is no input of password, transmission of the input data is stopped.

Figure 21:
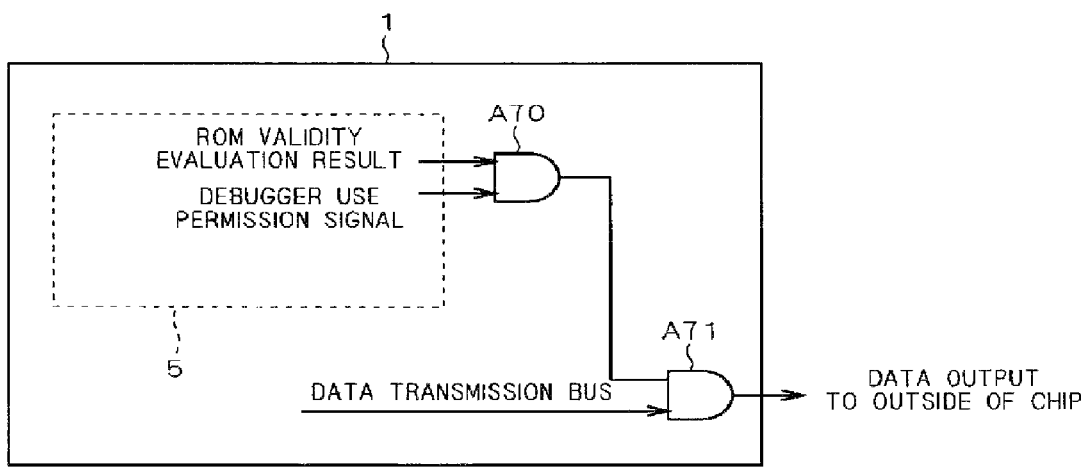
FIG. 21 is a view showing an encoding/decoding circuit in accordance with a twelfth preferred embodiment.

FIG. 21 is a view showing an encoding/decoding circuit in accordance with the twelfth preferred embodiment. In FIG. 21, the ROM validity evaluation result and the debugger use permission signal which are generated in the eleventh preferred embodiment are inputted to an AND gate A70 which is provided outside the encoding/decoding operation device 5, and unless both these inputs to the AND gate A70 are activated, the data on a data transmission bus provided inside the IC chip 1 can not be outputted to the outside of the chip. Specifically, an AND gate A71 is further provided and an output of the AND gate A70 and the data transmission bus are inputted to the AND gate A71. Unless the output of the AND gate A70 is activated, the AND gate A71 can not output the data on the data transmission bus to the outside of the chip.

In other words, in the twelfth preferred embodiment, the input data can be transmitted not through the encoding/decoding operation portion 52, and when the hash value of the key read out from the nonvolatile memory 2 is different from the hash value of the MAC 21 stored in the nonvolatile memory 2 or when use of a debugger is detected and there is no input of password, transmission of the input data is stopped.

Therefore, it is possible to realize an encoding/decoding circuit which disables transmission of the input data not through the encoding/decoding operation portion 52 and ensures the safety of data requiring concealment.

Though no particular description on the encoding/decoding operation portion 52 is made in the present invention, the encoding/decoding operation portion 52 is not limited to one kind. For example, if there are a plurality of kinds of ciphers used in processing the data stream, a plurality of encoding/decoding operation portions can be provided instead of one encoding/decoding operation portion 52 of FIG. 2. Further, if one encoding/decoding operation portion 52 can not achieve sufficient throughput, two encoding/decoding operation portions 52 of the same type can be provided.

<Others>

In the above discussion, the validity evaluation circuits shown in the ninth to eleventh preferred embodiments and the encoding/decoding circuit shown in the twelfth preferred embodiment are described, taking the case of the encoding/decoding circuit using the common key encryptosystem in accordance with the first preferred embodiment as an example. The concepts of the ninth to twelfth preferred embodiments, however, can be applied to an encoding/decoding circuit using a system other than the common key encryptosystem.

While the invention has been shown and described in detail, the foregoing description is in all aspects illustrative and not restrictive. It is therefore understood that numerous modifications and variations can be devised without departing from the scope of the invention.

What is claimed is:

1. An encoding/decoding circuit comprising:
a key storage portion in which a first generation encoding key is stored;
an encoding/decoding operation portion; and
an encoding key/decoding key generation coincidence judgment circuit,
wherein said encoding/decoding operation portion uses said first generation encoding key to generate a second generation encoding key for encoding input data, and updates said first generation encoding key and stores said second generation encoding key into said key storage portion,
said encoding/decoding operation portion uses an n-th (n: natural number) generation encoding key to generate an (n+1)th generation encoding key for encoding said input data, and stores said (n+1)th generation encoding key into said key storage portion for updating the n-th generation encoding key,
said encoding/decoding operation portion uses said first generation encoding key to generate a first generation decoding key for decoding said input data which is encoded by said first generation encoding key and stores said first generation decoding key into said key storage portion,
said encoding/decoding operation portion uses the (n+1)th generation encoding keys to generate the (n+1)th generation decoding keys for decoding said input data, respectively, and stores said (n+1)th generation decoding key into said key storage portion for updating the n-th generation decoding key,
said encoding key/decoding key generation coincidence judgment circuit activates an encoding key/decoding key generation coincidence signal indicating said n-th generation decoding key is valid if said encoding/decoding operation portion generates said n-th generation decoding key by using said corresponding n-th generation encoding key, and
said encoding key/decoding key generation coincidence judgment circuit inactivates said encoding key/decoding key generation coincidence signal if said n-th generation decoding key is generated by using a key other than said corresponding n-th generation encoding key.

2. The encoding/decoding circuit according to claim 1, wherein said encoding key/decoding key generation coincidence signal is given to said encoding/decoding operation portion, and said encoding/decoding operation portion stops said decoding or discards an operation result of said decoding if said encoding key/decoding key generation coincidence signal is inactivated.

3. An encoding/decoding circuit comprising:

a key storage portion in which a first generation encoding key is stored;

an encoding/decoding operation portion; and an encoding key/decoding key generation permission circuit, wherein said encoding/decoding operation portion uses said first generation encoding key to generate a second generation encoding key for encoding input data, and updates said first generation encoding key and stores said second generation encoding key into said key storage portion, said encoding/decoding operation portion uses an n-th (n: natural number) generation encoding key to generate an (n+1)th generation encoding key for encoding said input data, and stores said (n+1)th generation encoding key into said key storage portion for updating the n-th generation encoding key, said encoding/decoding operation portion uses said first generation encoding key to generate a first generation decoding key for decoding said input data which is encoded by said first generation encoding key and stores said first generation decoding key into said key storage portion, said encoding/decoding operation portion uses the (n+1)th generation encoding keys to generate the (n+1)th generation decoding keys for decoding said input data, and stores said (n+1)th generation decoding key into said key storage portion for updating the n-th generation decoding key, said encoding key/decoding key generation permission circuit generates an encoding key/decoding key n-th generation permission signal indicating said all generation decoding keys until the n-th generation are generated every time when said n-th generation decoding key is generated whenever said encoding/decoding operation portion generates said n-th generation decoding key to be valid by using said corresponding n-th generation encoding key.

* * * * *